United States Patent
Seguin et al.

(10) Patent No.: US 9,817,615 B2
(45) Date of Patent: Nov. 14, 2017

(54) NETWORK BASED FONT MANAGEMENT FOR IMAGING DEVICES

(71) Applicants: John Seguin, Woburn, MA (US); Christopher J. Roberts, Andover, MA (US); Vladimir Levantovsky, North Andover, MA (US)

(72) Inventors: John Seguin, Woburn, MA (US); Christopher J. Roberts, Andover, MA (US); Vladimir Levantovsky, North Andover, MA (US)

(73) Assignee: Monotype Imaging Inc., Woburn, MA (US)

( * ) Notice: Subject to any disclaimer, the term of this patent is extended or adjusted under 35 U.S.C. 154(b) by 0 days.

(21) Appl. No.: 13/692,593

(22) Filed: Dec. 3, 2012

(65) Prior Publication Data

US 2014/0153012 A1 Jun. 5, 2014

(51) Int. Cl.
*G06F 3/12* (2006.01)

(52) U.S. Cl.
CPC ............ *G06F 3/121* (2013.01); *G06F 3/1229* (2013.01); *G06F 3/1288* (2013.01); *G06F 3/1292* (2013.01); *G06F 3/1234* (2013.01)

(58) Field of Classification Search
CPC .... G06T 11/203; G06F 17/214; G06F 3/1225; G06K 15/02; G06K 15/1827
See application file for complete search history.

(56) References Cited

U.S. PATENT DOCUMENTS

| | | | |
|---|---|---|---|
| 4,244,657 A | 1/1981 | Wasylyk |
| 4,998,210 A | 3/1991 | Kadono |
| 5,263,132 A | 11/1993 | Parker et al. |
| 5,347,266 A | 9/1994 | Bauman et al. |
| 5,412,771 A | 5/1995 | Fenwick |
| 5,416,898 A | 5/1995 | Opstad et al. |
| 5,444,829 A | 8/1995 | Kawabata et al. |

(Continued)

FOREIGN PATENT DOCUMENTS

| | | |
|---|---|---|
| EP | 0949574 | 10/1999 |
| EP | 2166488 A2 | 3/2010 |

(Continued)

OTHER PUBLICATIONS

Adobe Systems Incorporated, "The Type 42 Font Format Specification," Technical Note #5012, Jul. 31, 1998, pp. 1-24.

(Continued)

*Primary Examiner* — Thomas Lett
(74) *Attorney, Agent, or Firm* — Fish & Richardson P.C.

(57) ABSTRACT

A system includes a computing device that includes a memory configured to store instructions. The computing device also includes a processor to execute the instructions to perform operations that include receiving a request from an imaging device indicating that the imaging device is unable to present textual content of an asset. The request includes one or more attributes of the textual content of the asset and the request is sent from the imaging device absent user input. Operations also include identifying an appropriate amount of font information from the received one or more attributes for the imaging device to present the asset, and, providing the identified font information to the imaging device for presenting the asset.

52 Claims, 13 Drawing Sheets

(56) References Cited

U.S. PATENT DOCUMENTS

| | | |
|---|---|---|
| 5,453,938 A | 9/1995 | Gohara et al. |
| 5,526,477 A | 6/1996 | McConnell et al. |
| 5,528,742 A | 6/1996 | Moore et al. |
| 5,533,174 A | 7/1996 | Flowers et al. |
| 5,586,242 A | 12/1996 | McQueen et al. |
| 5,606,649 A | 2/1997 | Tai |
| 5,619,721 A | 4/1997 | Maruko |
| 5,630,028 A | 5/1997 | DeMeo |
| 5,737,599 A | 4/1998 | Rowe et al. |
| 5,748,975 A | 5/1998 | Van De Vanter |
| 5,757,384 A | 5/1998 | Ikeda |
| 5,761,395 A | 6/1998 | Miyazaki et al. |
| 5,781,714 A | 7/1998 | Collins et al. |
| 5,877,776 A | 3/1999 | Beaman et al. |
| 5,940,581 A | 8/1999 | Lipton |
| 5,995,718 A | 11/1999 | Hiraike |
| 6,012,071 A | 1/2000 | Krishna et al. |
| 6,016,142 A | 1/2000 | Chang |
| 6,031,549 A | 2/2000 | Hayes-Roth |
| 6,044,205 A | 3/2000 | Reed et al. |
| 6,065,008 A | 5/2000 | Simon et al. |
| 6,073,147 A | 6/2000 | Chan et al. |
| 6,111,654 A | 8/2000 | Cartier |
| 6,141,002 A | 10/2000 | Kanungo et al. |
| 6,167,441 A | 12/2000 | Himmel |
| 6,249,908 B1 | 6/2001 | Stamm |
| 6,252,671 B1 | 6/2001 | Peng et al. |
| 6,282,327 B1 | 8/2001 | Betrisey |
| 6,313,920 B1 | 11/2001 | Dresevic et al. |
| 6,320,587 B1 | 11/2001 | Funyu |
| 6,330,577 B1 | 12/2001 | Kim |
| 6,343,301 B1 | 1/2002 | Halt et al. |
| 6,426,751 B1 | 7/2002 | Patel |
| 6,490,051 B1 | 12/2002 | Nguyen et al. |
| 6,512,531 B1 | 1/2003 | Gartland |
| 6,522,330 B2 | 2/2003 | Kobayashi |
| 6,522,347 B1 | 2/2003 | Tsuji |
| 6,583,789 B1 | 6/2003 | Carlson et al. |
| 6,657,625 B1 | 12/2003 | Chik et al. |
| 6,675,358 B1 | 1/2004 | Kido |
| 6,678,688 B1 | 1/2004 | Unruh |
| 6,687,879 B1 | 2/2004 | Teshima |
| 6,704,116 B1 | 3/2004 | Abulhab |
| 6,704,648 B1 | 3/2004 | Naik et al. |
| 6,718,519 B1 | 4/2004 | Taieb |
| 6,738,526 B1 | 5/2004 | Betrisey |
| 6,754,875 B1 | 6/2004 | Paradies |
| 6,760,029 B1 | 7/2004 | Phinney et al. |
| 6,771,267 B1 | 8/2004 | Muller |
| 6,810,504 B2 | 10/2004 | Cooper et al. |
| 6,813,747 B1 | 11/2004 | Taieb |
| 6,853,980 B1 | 2/2005 | Ying et al. |
| 6,856,317 B2 | 2/2005 | Konsella et al. |
| 6,882,344 B1 | 4/2005 | Hayes et al. |
| 6,901,427 B2 | 5/2005 | Teshima |
| 6,907,444 B2 * | 6/2005 | Narasimhan et al. ........ 709/200 |
| 6,952,210 B1 | 10/2005 | Renner et al. |
| 6,993,538 B2 | 1/2006 | Gray |
| 7,050,079 B1 | 5/2006 | Estrada et al. |
| 7,064,757 B1 | 6/2006 | Opstad et al. |
| 7,064,758 B2 | 6/2006 | Chik et al. |
| 7,155,672 B1 | 12/2006 | Adler et al. |
| 7,184,046 B1 | 2/2007 | Hawkins |
| 7,188,313 B2 | 3/2007 | Hughes et al. |
| 7,228,501 B2 | 6/2007 | Brown et al. |
| 7,231,602 B1 | 6/2007 | Truelove et al. |
| 7,346,845 B2 | 3/2008 | Teshima et al. |
| 7,477,988 B2 | 1/2009 | Dorum |
| 7,492,365 B2 | 2/2009 | Corbin et al. |
| 7,505,040 B2 | 3/2009 | Stamm et al. |
| 7,539,939 B1 | 5/2009 | Schomer |
| 7,552,008 B2 | 6/2009 | Newstrom et al. |
| 7,580,038 B2 | 8/2009 | Chik et al. |
| 7,583,397 B2 | 9/2009 | Smith |
| 7,636,885 B2 | 12/2009 | Merz et al. |
| 7,701,458 B2 | 4/2010 | Sahuc et al. |
| 7,752,222 B1 | 7/2010 | Cierniak |
| 7,768,513 B2 | 8/2010 | Klassen |
| 7,836,094 B2 | 11/2010 | Ornstein et al. |
| 7,882,432 B2 | 2/2011 | Nishikawa et al. |
| 7,937,658 B1 * | 5/2011 | Lunde .................. G06F 17/214 |
| | | 715/256 |
| 7,944,447 B2 | 5/2011 | Clegg et al. |
| 7,958,448 B2 | 6/2011 | Fattic et al. |
| 8,098,250 B2 | 1/2012 | Clegg et al. |
| 8,116,791 B2 | 2/2012 | Agiv |
| 8,201,088 B2 | 6/2012 | Levantovsky et al. |
| 8,201,093 B2 | 6/2012 | Tuli |
| 8,306,356 B1 | 11/2012 | Bever |
| 8,381,115 B2 | 2/2013 | Tranchant et al. |
| 8,413,051 B2 | 4/2013 | Bacus et al. |
| 8,464,318 B1 | 6/2013 | Hallak |
| 8,601,374 B2 | 12/2013 | Parham |
| 8,643,542 B2 | 2/2014 | Wendel |
| 8,643,652 B2 | 2/2014 | Kaplan |
| 8,644,810 B1 | 2/2014 | Boyle |
| 8,689,101 B2 | 4/2014 | Fux et al. |
| 8,731,905 B1 | 5/2014 | Tsang |
| 9,317,777 B2 | 4/2016 | Kaasila et al. |
| 9,319,444 B2 | 4/2016 | Levantovsky |
| 9,569,865 B2 | 2/2017 | Kaasila et al. |
| 9,626,337 B2 | 4/2017 | Kaasila et al. |
| 9,691,169 B2 | 6/2017 | Kaasila et al. |
| 2001/0052901 A1 | 12/2001 | Kawabata et al. |
| 2002/0010725 A1 | 1/2002 | Mo |
| 2002/0033824 A1 | 3/2002 | Stamm |
| 2002/0052916 A1 | 5/2002 | Kloba et al. |
| 2002/0057853 A1 | 5/2002 | Usami |
| 2002/0087702 A1 | 7/2002 | Mori |
| 2002/0093506 A1 | 7/2002 | Hobson |
| 2002/0174186 A1 | 11/2002 | Hashimoto et al. |
| 2002/0194261 A1 | 12/2002 | Teshima |
| 2003/0014545 A1 | 1/2003 | Broussard et al. |
| 2003/0076350 A1 | 4/2003 | Vu |
| 2003/0197698 A1 | 10/2003 | Perry et al. |
| 2004/0025118 A1 | 2/2004 | Renner |
| 2004/0088657 A1 | 5/2004 | Brown et al. |
| 2004/0119714 A1 | 6/2004 | Everett et al. |
| 2004/0177056 A1 | 9/2004 | Davis et al. |
| 2004/0189643 A1 | 9/2004 | Frisken et al. |
| 2004/0207627 A1 | 10/2004 | Konsella et al. |
| 2004/0233198 A1 | 11/2004 | Kubo |
| 2005/0015307 A1 | 1/2005 | Simpson et al. |
| 2005/0033814 A1 | 2/2005 | Ota |
| 2005/0094173 A1 | 5/2005 | Engelman et al. |
| 2005/0111045 A1 | 5/2005 | Imai |
| 2005/0128508 A1 | 6/2005 | Greef et al. |
| 2005/0149942 A1 | 7/2005 | Venkatraman |
| 2005/0190186 A1 | 9/2005 | Klassen |
| 2005/0193336 A1 | 9/2005 | Fux et al. |
| 2005/0200871 A1 | 9/2005 | Miyata |
| 2005/0264570 A1 | 12/2005 | Stamm |
| 2005/0270553 A1 | 12/2005 | Kawara |
| 2005/0275656 A1 | 12/2005 | Corbin et al. |
| 2006/0010371 A1 | 1/2006 | Shur et al. |
| 2006/0017731 A1 | 1/2006 | Matskewich et al. |
| 2006/0061790 A1 | 3/2006 | Miura |
| 2006/0072136 A1 | 4/2006 | Hodder et al. |
| 2006/0072137 A1 | 4/2006 | Nishikawa et al. |
| 2006/0072162 A1 | 4/2006 | Nakamura |
| 2006/0103653 A1 | 5/2006 | Chik et al. |
| 2006/0103654 A1 | 5/2006 | Chik et al. |
| 2006/0168639 A1 | 7/2006 | Gan |
| 2006/0241861 A1 | 10/2006 | Takashima |
| 2006/0245727 A1 | 11/2006 | Nakano et al. |
| 2006/0267986 A1 | 11/2006 | Bae et al. |
| 2006/0269137 A1 | 11/2006 | Evans |
| 2006/0285138 A1 | 12/2006 | Merz et al. |
| 2007/0002016 A1 * | 1/2007 | Cho et al. ..................... 345/157 |
| 2007/0006076 A1 | 1/2007 | Cheng |
| 2007/0008309 A1 | 1/2007 | Sahuc et al. |
| 2007/0050419 A1 | 3/2007 | Weyl et al. |
| 2007/0055931 A1 | 3/2007 | Zaima |
| 2007/0139412 A1 | 6/2007 | Stamm |

(56) References Cited

U.S. PATENT DOCUMENTS

| | | |
|---|---|---|
| 2007/0139413 A1 | 6/2007 | Stamm et al. |
| 2007/0159646 A1 | 7/2007 | Adelberg et al. |
| 2007/0172199 A1 | 7/2007 | Kobayashi |
| 2007/0211062 A1 | 9/2007 | Engleman et al. |
| 2007/0283047 A1 | 12/2007 | Theis et al. |
| 2008/0028304 A1 | 1/2008 | Levantovsky et al. |
| 2008/0030502 A1 | 2/2008 | Chapman |
| 2008/0154911 A1 | 6/2008 | Cheng |
| 2008/0282186 A1 | 11/2008 | Basavaraju |
| 2008/0303822 A1 | 12/2008 | Taylor |
| 2008/0306916 A1 | 12/2008 | Gonzalez et al. |
| 2009/0031220 A1 | 1/2009 | Tranchant |
| 2009/0063964 A1 | 3/2009 | Huang |
| 2009/0119678 A1 | 5/2009 | Shih |
| 2009/0158134 A1 | 6/2009 | Wang |
| 2009/0183069 A1 | 7/2009 | Duggan et al. |
| 2009/0275351 A1 | 11/2009 | Jeung et al. |
| 2009/0287998 A1 | 11/2009 | Kalra |
| 2009/0303241 A1 | 12/2009 | Priyadarshi et al. |
| 2009/0307585 A1 | 12/2009 | Tranchant et al. |
| 2010/0014104 A1 | 1/2010 | Soord |
| 2010/0066763 A1 | 3/2010 | MacDougall |
| 2010/0088606 A1 | 4/2010 | Kanno |
| 2010/0088694 A1 | 4/2010 | Peng |
| 2010/0091024 A1 | 4/2010 | Myadam |
| 2010/0115454 A1 | 5/2010 | Tuli |
| 2010/0164984 A1 | 7/2010 | Rane |
| 2010/0218086 A1 | 8/2010 | Howell et al. |
| 2010/0231598 A1 | 9/2010 | Hernandez et al. |
| 2010/0275161 A1 | 10/2010 | DiCamillo |
| 2010/0321393 A1 | 12/2010 | Levantovsky |
| 2011/0029103 A1 | 2/2011 | Mann et al. |
| 2011/0090229 A1 | 4/2011 | Bacus et al. |
| 2011/0090230 A1 | 4/2011 | Bacus et al. |
| 2011/0093565 A1 | 4/2011 | Bacus et al. |
| 2011/0115797 A1 | 5/2011 | Kaplan |
| 2011/0131153 A1 | 6/2011 | Grim, III |
| 2011/0188761 A1 | 8/2011 | Boutros et al. |
| 2011/0238495 A1 | 9/2011 | Kang |
| 2011/0271180 A1 | 11/2011 | Lee |
| 2011/0276872 A1 | 11/2011 | Kataria |
| 2011/0289407 A1 | 11/2011 | Naik |
| 2011/0310432 A1 | 12/2011 | Waki |
| 2012/0001922 A1 | 1/2012 | Escher et al. |
| 2012/0016964 A1 | 1/2012 | Veen et al. |
| 2012/0033874 A1 | 2/2012 | Perronnin |
| 2012/0066590 A1 | 3/2012 | Harris et al. |
| 2012/0072978 A1 | 3/2012 | DeLuca |
| 2012/0092345 A1 | 4/2012 | Joshi et al. |
| 2012/0102176 A1 | 4/2012 | Lee et al. |
| 2012/0102391 A1 | 4/2012 | Lee et al. |
| 2012/0127069 A1* | 5/2012 | Santhiveeran et al. ....... 345/156 |
| 2012/0134590 A1 | 5/2012 | Petrou |
| 2012/0215640 A1 | 8/2012 | Ramer et al. |
| 2012/0288190 A1 | 11/2012 | Tang |
| 2012/0306852 A1 | 12/2012 | Taylor |
| 2012/0307263 A1* | 12/2012 | Ichikawa et al. ............... 358/1.8 |
| 2012/0323694 A1 | 12/2012 | Lita et al. |
| 2012/0323971 A1 | 12/2012 | Pasupuleti |
| 2013/0033498 A1 | 2/2013 | Linnerud |
| 2013/0120396 A1 | 5/2013 | Kaplan |
| 2013/0127872 A1 | 5/2013 | Kaplan |
| 2013/0156302 A1 | 6/2013 | Rodriguez Serrano et al. |
| 2013/0163027 A1 | 6/2013 | Shustef |
| 2013/0179761 A1 | 7/2013 | Cho |
| 2013/0215126 A1 | 8/2013 | Roberts |
| 2013/0215133 A1 | 8/2013 | Gould et al. |
| 2013/0321617 A1 | 12/2013 | Lehmann |
| 2013/0326348 A1 | 12/2013 | Ip et al. |
| 2014/0025756 A1 | 1/2014 | Kamens |
| 2014/0047329 A1 | 2/2014 | Levantovsky et al. |
| 2014/0136957 A1 | 5/2014 | Kaasila et al. |
| 2014/0153012 A1 | 6/2014 | Seguin |
| 2014/0176563 A1 | 6/2014 | Kaasila et al. |
| 2014/0195903 A1 | 7/2014 | Kaasila et al. |
| 2015/0062140 A1 | 3/2015 | Levantovsky et al. |
| 2015/0074522 A1 | 3/2015 | Harned, III et al. |
| 2015/0097842 A1 | 4/2015 | Kaasila et al. |
| 2015/0100882 A1 | 4/2015 | Severenuk |
| 2015/0193386 A1 | 7/2015 | Wurtz |
| 2015/0278167 A1 | 10/2015 | Arnold et al. |
| 2015/0339273 A1 | 11/2015 | Yang et al. |
| 2015/0339543 A1 | 11/2015 | Campanelli et al. |
| 2015/0378297 A1 | 12/2015 | Kaasila et al. |
| 2016/0170940 A1 | 6/2016 | Levantovsky |
| 2016/0171343 A1 | 6/2016 | Kaasila et al. |
| 2016/0182606 A1 | 6/2016 | Kaasila et al. |
| 2016/0246762 A1 | 8/2016 | Eaton |
| 2016/0307347 A1 | 10/2016 | Matteson et al. |
| 2016/0321217 A1 | 11/2016 | Ikemoto et al. |
| 2016/0371232 A1 | 12/2016 | Ellis et al. |

FOREIGN PATENT DOCUMENTS

| | | |
|---|---|---|
| EP | 2857983 | 4/2015 |
| JP | 06-258982 | 9/1994 |
| JP | 10-124030 | 5/1998 |
| JP | 2002-507289 | 3/2002 |
| JP | 05-215915 | 8/2005 |
| JP | 05-217816 | 8/2005 |
| JP | 07-011733 | 1/2007 |
| TW | 544595 | 8/2003 |
| TW | 2005/11041 | 3/2005 |
| WO | WO 94/23379 | 10/1994 |
| WO | WO 99/00747 | 1/1999 |
| WO | WO 01/91088 | 11/2001 |
| WO | WO 03/023614 | 3/2003 |
| WO | WO 2004/012099 | 2/2004 |
| WO | WO 2005/001675 | 1/2005 |

OTHER PUBLICATIONS

Adobe Systems Incorporated, "PostScript Language Reference—Third Edition," Feb. 1999, pp. 313-390.

Adobe Systems Incorporated, "To Unicode Mapping File Tutorial," Adobe Technical Note, XP002348387, May 2003.

"Announcing Speakeasy: A new open-source language tool from Typekit," Oct. 28, 2010, on-line http://blog.typekit.com/2010/10/28/announcing-speakeasy-a-new-open-source-language-tool-from-typekit/.

Apple Computers, "The True Type Font File," Oct. 27, 2000, pp. 1-17.

Celik et al., "W3C, CSS3 Module: Fonts," W3C Working Draft, Jul. 31, 2001, pp. 1-30.

International Search Report & Written Opinion issued in PCT application No. PCT/US10/01272, mailed Jun. 15, 2010, 6 pages.

International Search Report & Written Opinion issued in PCT application No. PCT/US2011/034050 dated Jul. 15, 2011, 13 pages.

Japanese Office Action, 2009-521768, mailed Aug. 28, 2012.

Supplementary European Search Report, European Patent Office, European patent application No. EP 07796924, dated Dec. 27, 2010, 8 pages.

TrueType Fundamentals, Microsoft Typography, Nov. 1997, pp. 1-17.

International Search Report & Written Opinion, PCT/US2013/026051, mailed Jun. 5, 2013, 9 pages.

Doughty, Mike, "Using OpenType® Fonts with Adobe® InDesign®," Jun. 11, 2012 retrieved from the internet: http://webarchive.org/web/20121223032924/http://www.sketchpad.net/opentype-indesign.htm (retrieved Sep. 22, 2014), 2 pages.

Goswami, Gautum, "Quite 'Writly' Said!," One Brick at a Time, Aug. 21, 2006, Retrieved from the internet: :http://gautamg.wordpress.com/2006/08/21/quj.te-writely-said/ (retrieved on Sep. 23, 2013), 3 pages.

International Search Report & Written Opinion, PCT/US2014/010786, mailed Sep. 30, 2014, 9 pages.

Wenzel, Martin, "An Introduction to OpenType Substitution Features," Dec. 26, 2012, Retrieved from the internet: http://web.

(56) References Cited

OTHER PUBLICATIONS archive.org/web/20121226233317/http://ilovetypography.com/OpenType/opentype-features. Html (retrieved on Sep. 18, 2014), 12 pages.
"A first experiment with multicoloured web fonts," Manufactura Independente website, Feb. 28, 2011, Retrieved from the internet: http://blog.manufacturaindependente.org/2011/02/a-first-experiment-with-multicoloured-web-fonts/.
"Colorfont/vl," Feb. 28, 2011, retrieved from the internet: http://manufacturaindependente.com/colorfont/v1/.
International Search Report & Written Opinion, PCT/US2013/076917, mailed Jul. 9, 2014, 11 pages.
"photofont.com—Use photofonts," Sep. 2, 2012, retrieved from the internet: http://web.archive.org/web/20120902021143/http://photofont.com/photofont/use/web.
Extensis, Suitcase 10.2, Quick Start Guide for Macintosh, 2001, 23 pgs.
International Search Report & Written Opinion, PCT/US2013/071519, mailed Mar. 5, 2014, 12 pages.
Open Text Exceed, User's Guide, Version 14, Nov. 2009, 372 pgs.
Universal Type Server, Upgrading from Suitcase Server, Sep. 29, 2009, 18 pgs.
European Search Report, 13179728.4, Sep. 10, 2015, 3 pages.
Ma Wei-Ying et al., "Framework for adaptive content delivery in heterogeneous network environments", Jan. 24, 2000, Retrieved from the Internet: http://www.cooltown.hp.com/papers/adcon/MMCN2000.
"Saffron Type System", retrieved from the internet Nov. 12, 2014, 7 pages.
Font Pair, [online]. "Font Pair", Jan. 20, 2015, Retrieved from URL:http://web.archive.org/web/20150120231122/http://fontpair.co/, 31 pages.
Typeconnection, [online]. "Typeconnection", Feb. 26, 2015, Retrieved from URL:http://web.archive.org/web/20150226074717/http://www.typeconnection.com/stepl.php, 4 pages.
International Search Report & Written Opinion, PCT/US2016/023282, mailed Oct. 7, 2016, 16 pages.
Japanese Office Action, 2013-508184, mailed Apr. 1, 2015.
International Preliminary Report on Patentability issued in PCT application No. PCT/US2013/071519 dated Jun. 9, 2015, 9 pages.
European Search Report, 14184499.3, Jul. 13, 2015, 7 pages.
European Search Report, 14187549.2, Jul. 30, 2015 7 pages.
"Flash CS4 Professional ActionScript 2.0", 2007, retrieved on http://help.adobe.com/en_US/AS2LCR/Flash_10.0/help.html?content=00000284.html on Aug. 31, 2015.
Saurabh, Kataria et al., "Font retrieval on a large scale: An experimental study", 2010 17$^{th}$ IEEE International Conference on Image Processing (ICIP 2010); Sep. 26-29, 2010; Hong Kong, China, IEEE, Piscataway, NJ, USA, Sep. 26, 2010, pp. 2177-2180.
Forums.macrumors.com' [online]. "which one is the main Fonts folder ?" May 19, 2006, [retrieved on Jun. 19, 2017]. Retrieved from the Internet: URL<https://forums.macrumors.com/threads/which-one-is-the-main-fontsfolder.202284/>, 7 pages.
International Preliminary Report on Patentability issued in PCT application No. PCT/US2015/066145 dated Jun. 20, 2017, 7 pages.

* cited by examiner

```
mti.TextCollector.prototype.getFontTexts = function (node) {
    var pfL = this.projectFontList_;
    var fontFamily = this.domHelper_.getComputedFontFamily(node);
    fontFamily = (fontFamily || "").replace(/^\s|\s$/g, "").replace(/"|'/g, "").replace(/,\s*/g, "|");
    if (fontFamily == "")
        return;
    var patt = new RegExp(fontFamily, 'ig');
    for (i = 0; i < pfL.length; i++) {
        var val = pfL[i];
        var projectFontFamily = val["fontfamily"];

if (patt.test(projectFontFamily.replace(/^\s|\s$/g, ""))) {
            this.domHelper_.appendClassName(node, "mti_font_element");

this.elementCache_.push(node);

if (val["enableSubsetting"]) {
                if (!this.queryFontList_[projectFontFamily.replace(/^\s|\s$/g, "")]) {
                    this.queryFontList_[projectFontFamily.replace(/^\s|\s$/g, "")] =
                        this.domHelper_.getText(node);
                }
                else {
                    this.queryFontList_[projectFontFamily.replace(/^\s|\s$/g, "")] +=
                        this.domHelper_.getText(node);
                }
            }
        }
    }
}
```

```
mti.TextCollector.prototype.getFontTexts = function (node) {
    var pfL = this.projectFontList_;
    var fontFamily = this.domHelper_.getComputedFontFamily(node);
    fontFamily = (fontFamily || "").replace(/^\s|\s$/g, "").replace(/['"]/g, "").replace(/,\s*/g, "|");
    if (fontFamily == "") return;
    var patt = new RegExp(fontFamily, 'ig');
    for (i = 0; i < pfL.length; i++) {
        var val = pfL[i];
        var projectFontFamily = val["fontfamily"];
        if (patt.test(projectFontFamily.replace(/^\s|\s$/g, ""))) {
            this.domHelper_.appendClassName(node, "mti_font_element");
            this.elementCache_.push(node);
            if (val["enableSubsetting"]) {
                if (!this.queryFontList_[projectFontFamily.replace(/^\s|\s$/g, "")]) {
                    this.queryFontList_[projectFontFamily.replace(/^\s|\s$/g, "")] = this.domHelper_.getText(node);
                }
                else {
                    this.queryFontList_[projectFontFamily.replace(/^\s|\s$/g, "")] += this.domHelper_.getText(node);
                }}}}}
mti.MonotypeFontApi.prototype.extractUniqueChars = function (str) {
    if (str && typeof (str) == "string") {
        str = str.replace(/\s/g, "").replace(/\n/g, "").replace(/\r/g, "");
        var uniq = "", textLength = str.length, curChar = null;
        for (var i = 0; i < textLength; i++) {
            curChar = str.charAt(i);
            if (uniq.indexOf(curChar) == -1) uniq += curChar;
        } return uniq;
    } return "";
}
```

FIG. 8

```
mti.MonotypeFontApi.prototype.makeFontContentURL =
function (contentIdArray, projectId, eset, ec, fcURL, dfcURL, ck, fontFamily, fontToCharMap) {
    var self = this;
    var contentId = contentIdArray[fFormat.toUpperCase()]; var p = "http://";
    if (window.location.protocol == "https:") { p = "https://"; }
    fcURL = fcURL.replace("http://", "").replace("https://", "");
    dfcURL = dfcURL.replace("http://", "").replace("https://", "");
    fcURL = p + fcURL;
    dfcURL = p + dfcURL;
    if (eset) {
        url = dfcURL + "?";
        if (ec)  url += (ck + "&");
        url += ("fctypeId=" + self.configuration_["fctypeArray"][fFormat] + "&fcId="
            + contentIdArray["TTF"] + "&origId=" + contentId);
    } else {
        if (ec) {
            if (contentId) {
                url = fcURL + contentId + "." + fFormat.toLowerCase() + "?" + ck;
            } else
                url = fcURL + contentIdArray["TTF"] + ".ttf" + "?" + ck;
        } else {
            url = fcURL + "?fctypeId=" + self.configuration_["fctypeArray"][fFormat] + "&fcId=" + contentId;
        }
    }
    url += ("&projectId=" + projectId);
    if (fontToCharMap) { url += "&content=" + escape((fontToCharMap[fontFamily] || "") + "giMm"); }
    //Mm is use by fontwatcher to track the font download
    var isSVG = (fFormat != null && (fFormat.toUpperCase() == "SVG"));
    if (isSVG) {
        url += ("#" + contentId);
    }
    return url;
}
```

NETWORK BASED FONT MANAGEMENT FOR IMAGING DEVICES

BACKGROUND

This description relates to managing the delivery of fonts and related information to imaging devices such as printers, computing devices, etc.

In the ever-expanding connectivity provided by computer networks such as the Internet, various types of content such as text, graphics, audio, video, etc. may be included in assets (e.g., documents, presentations, websites, webpages, etc.) for presenting to individuals using a computing device or broadcast to a multitude. Incorporating such content into assets may provide viewers with a more enjoyable viewing experience while assisting with a more efficient transfer of information. However, technology does not always allow such a rapid expansion of different types and dramatic layouts of content to occur without being somewhat constrained. Device functionality, operating systems, driver software, etc. may impede presentation and limit a viewer's ability to view the originally authored content.

SUMMARY

The systems and techniques described here relate to identifying that appropriate information is not present at an imaging device (e.g., a printer, computing device, etc.) for presenting one or more assets (e.g., electronic documents, presentations, web pages, web sites, etc.). For example, one or more fonts may not be available at the imaging device (e.g., a printer) and are identified as being needed to present (e.g., print) an asset or assets as originally authored. Once identified, the needed font information is provided to the imaging device in response to a request sent from the device absent user input. By providing such font information in a seamless manner, the viewer is not distracted or frustrated for having to take part in the imaging device being delivered appropriate font information. Further, by not being distracted by the process, the viewer's experience may be improved along with the viewer's interest in the content being presented.

In one aspect, a computer-implemented method includes receiving a request from an imaging device indicating that the imaging device is unable to present textual content of an asset. The request includes one or more attributes of the textual content of the asset and the request is sent from the imaging device absent user input. The method also includes identifying an appropriate amount of font information from the received one or more attributes for the imaging device to present the asset, and, providing the identified font information to the imaging device for presenting the asset.

Implementations may include one or more of the following features. Identifying the appropriate amount of font information may include identifying one or more fonts. Identifying the appropriate amount of font information may include creating one or more fonts. The appropriate amount of font information may include one or more font subsets based on the textual content of the asset. The one or more attributes may include information for identifying one or more fonts absent from the imaging device. The one or more attributes may include information for identifying one or more fonts absent from the asset. The one or more attributes may include information representing the structure of the asset. The request may also include one or more environmental characteristics of a communication connection between the imaging device and a font service provider. The request may include one or more attributes that represent at least one capability of the imaging device. The request may include geographical information regarding the location of the imaging device.

In another aspect, a computer-implemented method includes receiving at an imaging device data representing textual content of one or more assets. The method also includes parsing the data representing the textual content to determine if font information is absent at the imaging device for presenting the textual content of the one or more assets, and, sending a request to a font service provider for requesting the absent font information for presenting the one or more assets. The request is sent to the font service provider absent user input.

Implementations may include one or more of the following features. The request may identify a font used by the textual content of the one or more assets but absent at the imaging device. The request may identify information associated with the one or more assets to be presented by the imaging device. Parsing the data representing the textual content may include identifying each character present in the textual content of the one or more assets. The request may identify each character present in the textual content of the one or more assets.

In another aspect, a system includes a computing device that includes a memory configured to store instructions. The computing device also includes a processor to execute the instructions to perform operations that include receiving a request from an imaging device indicating that the imaging device is unable to present textual content of an asset. The request includes one or more attributes of the textual content of the asset and the request is sent from the imaging device absent user input. Operations also include identifying an appropriate amount of font information from the received one or more attributes for the imaging device to present the asset, and, providing the identified font information to the imaging device for presenting the asset.

Implementations may include one or more of the following features. Identifying the appropriate amount of font information may include identifying one or more fonts. Identifying the appropriate amount of font information may include creating one or more fonts. The appropriate amount of font information may include one or more font subsets based on the textual content of the asset. The one or more attributes may include information for identifying one or more fonts absent from the imaging device. The one or more attributes may include information for identifying one or more fonts absent from the asset. The one or more attributes may include information representing the structure of the asset. The request may also include one or more environmental characteristics of a communication connection between the imaging device and a font service provider. The request may include one or more attributes that represent at least one capability of the imaging device. The request may include geographical information regarding the location of the imaging device.

In another aspect, a system includes a computing device that includes a memory configured to store instructions. The computing device also includes a processor to execute the instructions to perform operations that include receiving at an imaging device data representing textual content of one or more assets. Operations also include parsing the data representing the textual content to determine if font information is absent at the imaging device for presenting the textual content of the one or more assets, and, sending a request to a font service provider for requesting the absent font information for presenting the one or more assets. The request is sent to the font service provider absent user input.

Implementations may include one or more of the following features. The request may identify a font used by the textual content of the one or more assets but absent at the imaging device. The request may identify information associated with the one or more assets to be presented by the imaging device. Parsing the data representing the textual content may include identifying each character present in the textual content of the one or more assets. The request may identify each character present in the textual content of the one or more assets.

In another aspect, one or more computer readable media storing instructions that are executable by a processing device, and upon such execution cause the processing device to perform operations that include receiving a request from an imaging device indicating that the imaging device is unable to present textual content of an asset. The request includes one or more attributes of the textual content of the asset and the request is sent from the imaging device absent user input. Operations also include identifying an appropriate amount of font information from the received one or more attributes for the imaging device to present the asset, and, providing the identified font information to the imaging device for presenting the asset.

Implementations may include one or more of the following features. Identifying the appropriate amount of font information may include identifying one or more fonts. Identifying the appropriate amount of font information may include creating one or more fonts. The appropriate amount of font information may include one or more font subsets based on the textual content of the asset. The one or more attributes may include information for identifying one or more fonts absent from the imaging device. The one or more attributes may include information for identifying one or more fonts absent from the asset. The one or more attributes may include information representing the structure of the asset. The request may also include one or more environmental characteristics of a communication connection between the imaging device and a font service provider. The request may include one or more attributes that represent at least one capability of the imaging device. The request may include geographical information regarding the location of the imaging device.

In another aspect, one or more computer readable media storing instructions that are executable by a processing device, and upon such execution cause the processing device to perform operations that include receiving at an imaging device data representing textual content of one or more assets. Operations also include parsing the data representing the textual content to determine if font information is absent at the imaging device for presenting the textual content of the one or more assets, and, sending a request to a font service provider for requesting the absent font information for presenting the one or more assets. The request is sent to the font service provider absent user input.

Implementations may include one or more of the following features. The request may identify a font used by the textual content of the one or more assets but absent at the imaging device. The request may identify information associated with the one or more assets to be presented by the imaging device. Parsing the data representing the textual content may include identifying each character present in the textual content of the one or more assets. The request may identify each character present in the textual content of the one or more assets.

These and other aspects and features and various combinations of them may be expressed as methods, apparatus, systems, means for performing functions, program products, and in other ways.

Other features and advantages will be apparent from the description and the claims.

DESCRIPTION OF DRAWINGS

FIGS. 7, 8 and 9 illustrate examples of code instructions.

DETAILED DESCRIPTION

Figure 1:
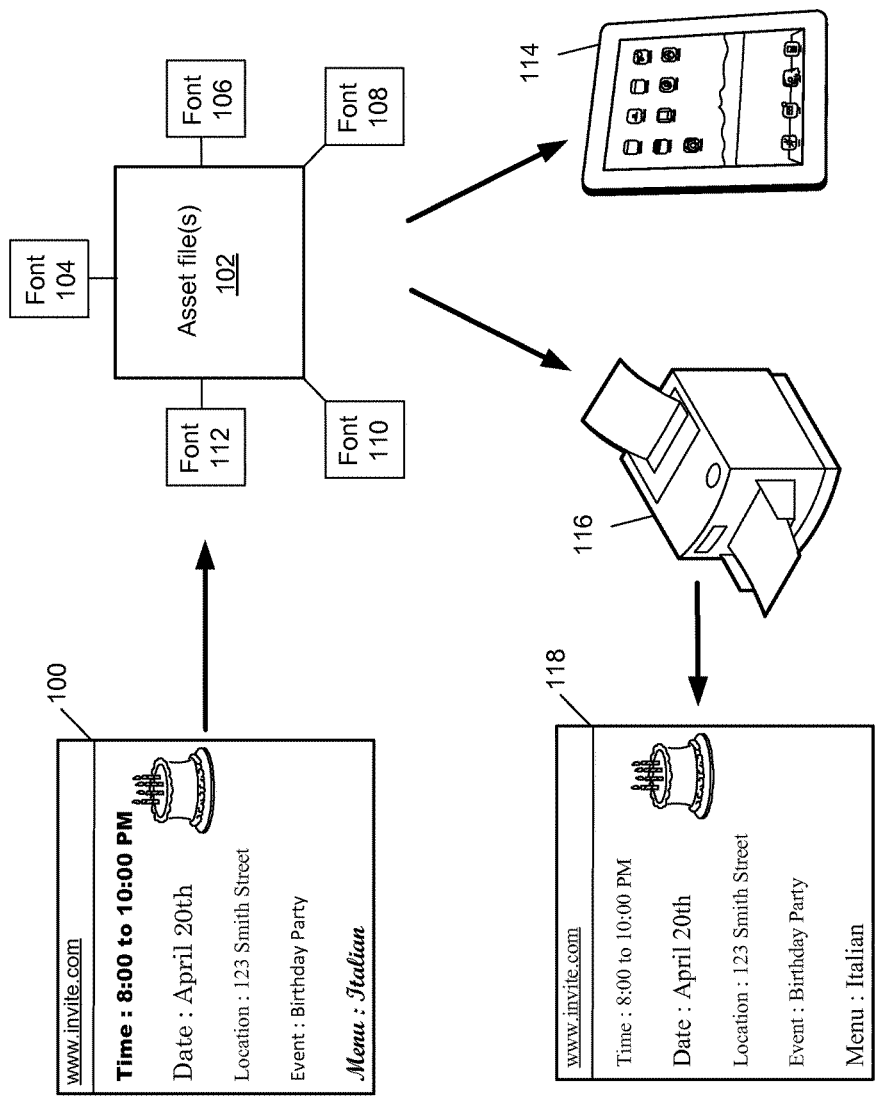
FIG. 1 illustrates exemplary content that may be provided to imaging devices for presentation.

Referring to FIG. 1, various types of assets may be produced for presentation. For example, assets such as documents, presentations, etc. may be produced locally or remotely by a computing device (e.g., a computer system, smart telephone, etc.), or, assets such as a web asset (e.g., a webpage 100) may also be remotely produced and may be accessible through the Internet (or other type of computer network). Such web assets like webpage 100 (e.g., a webpage, website, etc.) may be accessed by providing an appropriate identifying information (e.g., a uniform resource locator (URL)) to a web browser or other type of asset presenter. For example, once accessed, the web asset may be packaged and sent from a corresponding asset provider to an imaging device (e.g., a computing device, printer, etc.) for presentation. In the illustrated example, the content of the webpage 100 is a birthday party invitation that includes text and graphics and may be accessed from a particular URL (i.e., www.invite.com). To provide an eye-catching invitation, multiple fonts are used that provide different typefaces, each of which can be considered as providing stylistic characters or glyphs. In general, for presenting such text and similar graphics, various types of font families (e.g., Times New Roman, Arial, etc.) may be used that typically include a set of fonts, e.g., regular, italic, bold, bold italic, etc. Each font generally includes a set of individual character shapes called glyphs and the glyphs generally share various design features (e.g., geometry, stroke thickness, serifs, size, etc.) associated with the font. One or more techniques may be utilized for representing such fonts; for example, outline-based representations may be adopted in which lines and curves are used to define the borders of glyphs. Such fonts may be scalable for a variety of sizes (e.g., for presenting by various imaging devices) and may be represented in one or more formats. For example, scalable outline fonts may be represented in a format that includes data structures capable of supporting a variety of typographic visual symbols of many languages.

Once produced, assets (e.g., electronic documents, presentations, etc.) may be provided to imaging devices for presentation. For example, one or more electronic documents (e.g., an MS-Word document, MS-PowerPoint presentation, MS-Excel file, portable document format (PDF) file, etc.) may be provided (e.g., directly sent from a local computing device, sent remotely using one or more protocols such as electronic mail protocols, etc.) to an imaging device (e.g., a printer). Produced assets may also be accessed from remote. For example, once accessed, a content provider may use one or more techniques to provide the content of the webpage 100 to an imaging device. In this arrangement, the webpage 100 may be represented in one or more asset files 102 that may employ one or more techniques. For example, the asset files 102 may include a hypertext markup language (HTML) file that includes instructions for presenting the asset and a cascading style sheet (CSS) file that provides presentation semantics for the asset being presented by the HTML file. Standards such as the World Wide Web Consortium (W3C) standards for HTML, CSS, XML and other standards may be implemented so the webpage 100 can be properly rendered on various types of imaging devices capable of displaying electronic content (e.g. computer systems, tablet computing device, smart phones, personal digital assistants (PDAs), handheld computers, set-top boxes, heads up display (HUD), Internet appliances, etc.). Along using with displaying electronic content, other type of imaging devices may be used for content presentation. For example, printers (e.g., for hard copy presentations) and other types of devices may be used for presented the content of the webpage 100.

Along with providing graphics (e.g., a graphic of a birthday cake in this instance), the one or more asset files may reference one or more fonts used to render text on the webpage. For illustration, five different fonts are used in the webpage 100 to provide information associated with the invitation (e.g., time, date, location, event description, and menu). As such, the asset file(s) 102 calls out each font such that the recipient imaging device is aware which font corresponds to each portion of textual information (e.g., present the date in a "Times New Roman" font). Upon receiving and executing the instructions included in the asset file(s) 102, the recipient imaging device may locally retrieve the fonts needed to present the text. However, considerable numbers of imaging devices (e.g., printers, computer systems, etc.) may be unable to locally store all the characters of each font that could be needed to render the webpage. Limited resources (e.g., memory) and the constant creation of new font types can limit each type of imaging device from being ready to display text in any and all fonts. Fonts associated with different languages amplify the issue that many imaging devices are unable to provide all font types. Languages such as Chinese, Japanese, Korean, etc. use alphabets of characters that may number in the tens of thousands (e.g., over 10,000 characters) and call for 1 MB to 20 MB of memory to store the characters of a single language. Such memory needs are impractical, especially for imaging devices with less robust onboard memory (e.g., printers, cellular telephones, etc.). From some devices, font substitution techniques may be employed for presenting content. For example, a device may substitute the nearest equivalent font (based upon appearance) for a font included in an asset but not residing at the device.

Following the logic of having every potential font type locally stored at an imaging device, storing complete character sets for even a few fonts may be inefficient if only a few characters are needed from a set (e.g., to present a particular webpage or other type of asset). Referring to the illustrated example, a relatively small number of "Times New Roman" font characters are needed to present the event date (e.g., "A", "p", "r", "i", "1", "2", "0", "t" and "h") and storing the complete font character set may be considered an unwise use of memory of an imaging device, certainly if a complete character set is stored for each possible user language (e.g., English, Chinese, Japanese, etc.). Further, the time needed for transferring fonts along with bandwidth consumption may also provide a concern. For example, transferring complete character sets of fonts associated with languages such as Chinese, Japanese and Korean may need considerable bandwidth and transfer time.

To conserve the use of local memory, some conventional techniques provide complete font sets with the received asset (e.g., an HTML file) or initiate the retrieval of the complete character sets of needed fonts upon receipt of the file associated with the webpage. However, such techniques may still cause computing device memory to be filled with collections of font characters when only a few characters are actually being used by the webpage. For example, as illustrated in the figure, to present the webpage 100 with an imaging device, complete font character sets 104, 106, 108, 110, 112 are provided along with the asset file(s) 102. As such, each possible character of the five fonts used by the webpage 100 is provided to the imaging device, thereby consuming a considerable amount of memory of the imaging device. While some devices may have the capacity to store and process the complete font sets, other devices may simply not have the memory. For example, provided all of this data, a tablet computing device 114 may or may not have the memory or processing power to present the webpage 100.

In some situations font sets may not be provided with asset files and the device may use locally residing fonts to present the asset. For example, provided the asset file(s) 102, a printer 116 may substitute for any font identified in the asset file(s) that is not present in the printer. By substituting each non-present font with the closest matching font, the printer may attempt to present the asset. However, while similar information may be presented the overall look and style of the asset may be sacrificed. In this particular example, the printer 116 produces a printout 118 of the asset that includes local font characters (stored on the printer) substituted for the originally selected fonts in the webpage 100. In this instance the printout used that same substitute font (Times New Roman) for each of line of text presented in the printout 118. As such, the printout 118 is absent the overall look and style of the original web page 100.

One or more techniques may be implemented to provide appropriate font information that may be absent from an imaging device. For example, based upon the asset delivered a determination could be executed that identities the particular font or fonts that are needed to present the asset and which of the font or fonts is absent from the imaging device. To identify the absent font(s), attributes of the missing font(s) may be identified and used to attaining the appropriate font information and providing the information to the imaging device. Such attributes could include the name of the font, one or more metrics associated with the missing font(s) (e.g., footprint on page, height, width, etc.). Information associated with the asset may also be used for identifying the missing font(s), for example, the of the asset (e.g., number of lines in the document, spacing, number of paragraphs in the web page, page breaks, number of characters per line, etc.) could be used for font identification. Device information such as device type and model, functionality and capacity of the device, software executed by the device (e.g., operating system, web browser, etc.) may be used for font identification.

Environmental attributes may also be used for font identification. For example, one or more techniques may be used to reduce the file transfer time, bandwidth consumption and needed memory space for preparing to present assets such as webpage 100. For example, rather than providing complete character sets for each font, font subsets may be provided that include only the characters that appear in the asset (e.g., the webpage 100). As such, file transfer time and bandwidth needs may be reduced and device memory is conserved while an appropriate set of font characters is provided for asset presentation. Referring to the illustrated example, each of the font character sets 104-112 may be replaced with significantly smaller font subsets that can be provided with the asset file(s) 102 or relatively soon after receipt of the file. Similar to reducing transfer time and bandwidth needs based on font subsets for the stylistic appearance of characters, reductions may also be achieved for providing font subsets associated with different languages. For example, if a webpage contains only three hundred Chinese characters, it may be more efficient to provide a font subset that is restricted to only include the three hundred characters, which may reduce the size of the transferred font data from approximately 10 MB to 50 KB. In some situations while subsets may be produced for some font character sets (e.g., the Chinese language character set), other font character sets may be sent as complete sets. For example, due to the relatively small number of characters included in a complete font set (e.g., the Latin language character set), creating and transferring a subset may not significantly reduce the bandwidth or time needed to transfer the entire character set. Along with reducing the size of font character sets provided to a computing device to present a webpage or other types of asset, one or more techniques may be implemented to efficiently provide such font subsets to imaging devices (e.g., the tablet computing device 114, the printer 116, etc.). For example, along with presenting the webpage, the user's computing device may be used for identifying the appropriate font subsets and subsequently request the identified subsets.

Other attributes that may assist in font identification may include information associated with the source of the asset to be presented, information regarding the delivery recipient of the asset (e.g., business that operates the imaging device), etc. For example, the geographical region in which the asset source, recipient, etc. is located may assist in identifying one or more fonts that may be needed for presenting the asset. The business and business relationship of the source, recipient, etc. may also be attributes that factor into the fonts used by one or more of the entities. For example, particular fonts may be used more or less frequently in communications among the asset sources, recipients, etc. Such information may assist with identifying one or more fonts being absent at an asset delivery site or device (e.g., the printer 116). By using such attributes for font identification, little if any user input is needed for font identification. For example, operations may be executed absent input from the user of the recipient device (e.g., the user of the tablet device 114, the printer 116, etc.). As such, an end user may not be distracted, frustrated, etc. by requests for input to assist with font identification. Further, absent the need for user input, font identification operations may occur in a seamless manner and more efficiently execute to identify the fonts missing at the device.

Figure 2:
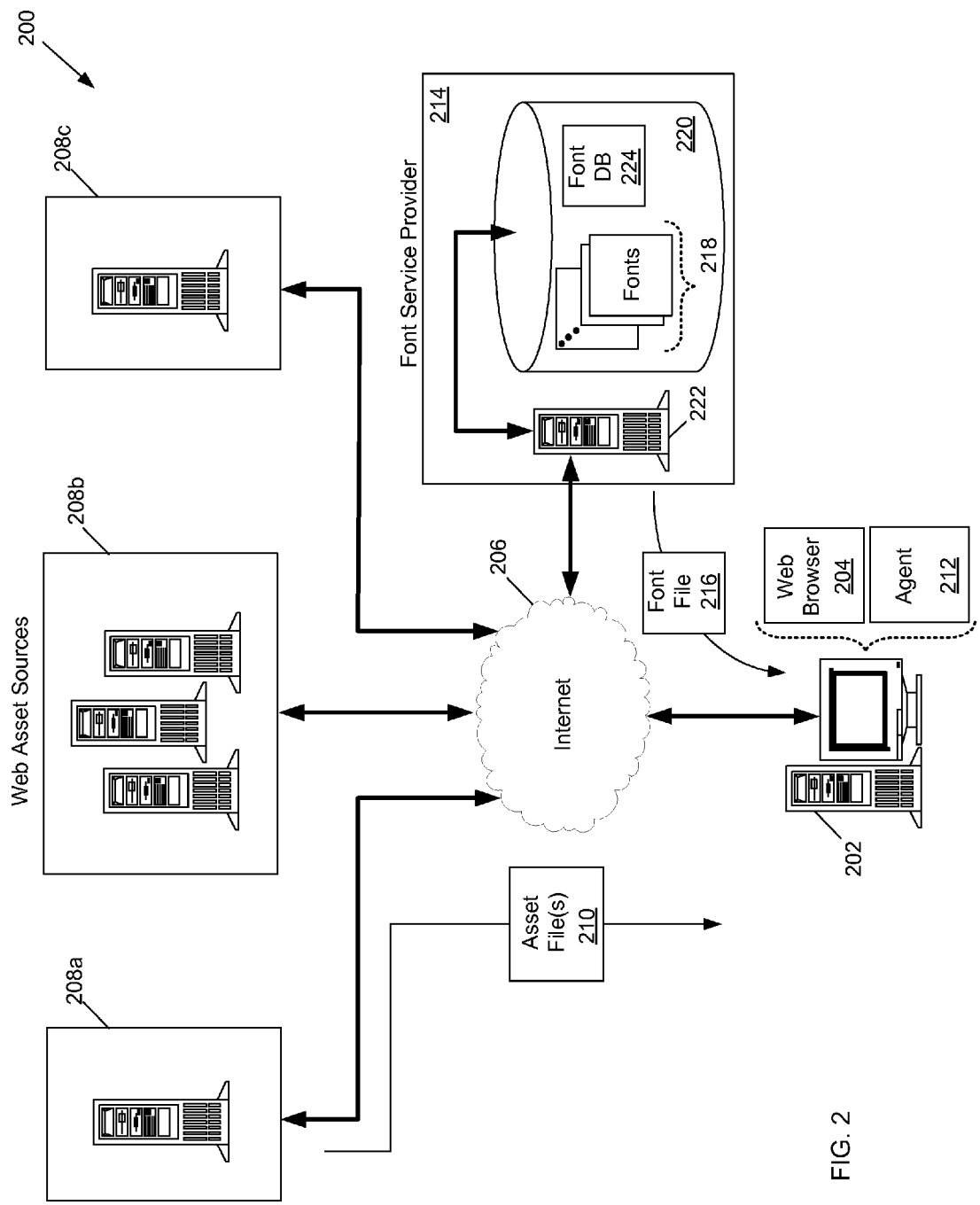
FIG. 2 is a block diagram of an Internet based computer network.

Referring to FIG. 2, a computing environment 200 includes a computer system 202 that a user may interact with (e.g., using a keyboard or pointing device such as a mouse) to identify a target web asset (e.g., a webpage) to be presented by the computer system. For example, a web browser 204 or similar software application may be executed by the computer system 202 for the user to target one or more webpages. Upon being identified, operations of the web browser 204 may include requesting, via the Internet 206, content from one or more web asset sources 208 a,b,c for the target webpage(s). As illustrated, in this particular example a webpage page is requested from webpage source 208a and a corresponding asset file(s) 210 (e.g., an HTML file, a CSS file, etc.) is sent from the source through the Internet 206 to the computer system 202. In one arrangement, the web asset files 210 include a hypertext markup language (HTML) file that includes instructions for presenting the asset and a cascading style sheet (CSS) file that provides presentation semantics for the asset being provided by the HTML file.

Once the asset file(s) 210 have been received, one or more techniques may be implemented to determine if one or more fonts used by the asset is missing from the computer system 202. For example, operations may be executed by the computer system 202 to scan one or more of the asset file(s) 210 (e.g., a HTML file, a CSS file, etc.) to identify the individual fonts, font characters, etc. included in the webpage as defined by the file(s). In one arrangement, the computer system 202 may execute a software agent 212 to identify the individual fonts, font characters, etc. and to determine if one or more of these fonts, font characters, etc. is absent from the computer system 202 (e.g., not residing in memory, a local storage device, etc.). If font information (e.g., one or more fonts, font characters, etc.) is determined to be absent, one or operations (e.g., gather information for identifying the absent font(s), etc.) may be executed by the software agent alone or in concert with the computer system 202 (and potentially other computing devices). For example, the software agent may initiate a request being sent to attain the appropriate font information be provided for presenting the asset (e.g., the target webpage). Such agents can be considered as a software module that is executable in a substantially autonomous manner. For example, upon being provided to the computer system 202, a software agent may operate without considerable user interaction. By operating in a somewhat flexible manner, the software agent can adaptively identify fonts, font characters, etc. needed for presenting an asset such as a webpage. In this particular example, the software agent 212 scans the content of the asset file(s) 210 (e.g., a HTML file, a CSS file, etc.) in a somewhat persistent manner for identifying the fonts, font characters, etc. called out by the file(s). For example, the software agent may execute in a substantially continuous manner. In some arrangements the software agent is provided to the user computing device (e.g., computer system 202) very shortly after the delivery of the asset file(s) 210. As such, web assets such as webpages, application pages, user interfaces, and the like may be perceived as being scanned nearly in real time as the documents are received.

In some arrangements, operations of the software agent 212 may be initiated by one or more conditions being satisfied, one or more events occurring, etc. For example, the software agent 212 may not use the contents of the asset file(s) 210 until appropriately signaled that one or more events have occurred. In one arrangement, applications such as a text-to-speech application may process the contents of the asset file(s) 210 prior to being used by the software agent 212. For example, once textual content of the web asset file(s) 210 (e.g., an HTML file) has been read by the text-to-speech application (e.g., for conversion to audible speech), one or more signals may be sent (or other type of signaling technique employed) to notify the software agent 212 that the web asset files(s) 210 may be accessed and used.

The computing environment 200 also includes a font service provider 214 that receives the missing font information from the computer system 202 (e.g., from operations of the software agent 212) and determines the appropriate font information (e.g., missing fonts, font characters, font subsets, etc.) needed for delivery to the computer system for presenting the target asset. In some arrangements, the font service provider may create new fonts to address the needs of the requesting imaging device (e.g., the computer system 202). Once produced, the font information (e.g., illustrated as font file 216) is prepared and sent by the font service provider 214 to the requesting imaging device (e.g., the computer system 202). In some arrangements, the information may be directed to other imaging devices (e.g., one or more other computer systems, printers, etc.) in need of the font information. Along with identifying appropriate fonts based on the information included in the request from the software agent 212, the font service provider 214 may execute other operations. For example, the font service provider 214 may determine to produce one or more font subsets based upon the information from the software agent 212. Additionally, the font service provider 214 may be capable of determining if complete font character sets should be provided to the requesting computing device. For example, predefined rules may be used by the font service provider 214 in determining whether a font subset should be sent. One such rule may indicate that font character sets associated with particular languages (e.g., Chinese) should have subsets created due to the large size of the complete character set. Subset determinations may also be provided in a dynamic manner. For example, based upon achievable file transfer rates, a file size threshold (e.g., 2 MB) may be determined such that subsets are produced for character sets larger than the threshold. If a font character set size falls below the threshold, the entire character set may be sent as the file transfer rate may be considered within an efficient range. Such thresholds may be dynamically adjusted, for example, by monitoring the achievable transfer rates, the threshold may be changed. For example, as the level of achievable transfer rates decreases, the threshold for creating subsets for character sets may correspondingly be decreased (e.g., lowered from 2 MB to 1 MB). One or more attributes may account for determining the transfer rates as being within an efficient range. For example, geographic location of the user computing device (e.g., as provide by the request) and the font service provider may factor into whether a subset should be produced and sent in place of a complete character set. If both the font service provider and the imaging device are located relatively nearby (e.g., both in the eastern United States), relatively high transfer rates may be achievable and the entire character set may be sent. For a situation in which the imaging device is remote from the font service provider (e.g., one in the United States and the other in India), the font service provider may determine to subset the font character set to be sent. Similar to location based determinations, time of day, season of year and other temporal factors may be used by the font service provider to determine if subsets need to be produced for one or more font character sets identified for transmission. Similar to being used for font subset determinations, such information may also be used by the font service provider 214 for other determinations such as identifying other types of font information (e.g., missing fonts, etc.) to be provided by the font service provider 214 to one or more imaging devices (e.g., the computer system 202 that requested the information).

In some arrangements, the font service provider 214 may also provide the software agents to the computing devices for performing operations such as scanning received files (e.g., the asset file(s) 210) for identifying fonts characters, etc. not locally present along with identifying other information (e.g., the type of browser being executed, computing device being used, etc.). As such, the font service provider 214 may operate independent of the webpage sources 208 a,b,c. Once a request is received from a user computing device, the font provider 214 may provide appropriate agent software to the requesting device for gathering information to identify any missing fonts, font characters, etc. and provide the information to the font service provider 214 for taking corrective action (e.g., providing font information such as the missing fonts, appropriately subset fonts for delivery to the user computing device, etc.). Agents provided by the font service provider may also provide other functionality, for example, the agents may direct the deletion of provided fonts, font subsets, based on one or more conditions (e.g., expired license term, expired period of time, etc.).

Along with the information provided by the computer system 202 (e.g., via the software agent 212), to provide font information associated with any missing fonts, characters, etc., the font service provider 214 typically needs access to one or more libraries of fonts that may be stored local or remote to the font service provider. As represented in the figure, a library of fonts 218 is shown being stored in a storage device 220 (e.g., one or more hard drives, CD-ROMs, etc.) on site. Being accessible by a server 222, the font library 218 may be used along with information provided from software agents to produce appropriate font information (e.g., complete font sets, font subsets, etc.). Illustrated as being stored in a single storage device 220, the font service provider 214 may use numerous storage techniques and devices to retain a collection of accessible sets of fonts (e.g., for different font styles, languages, etc.). The font service provider 214 may also access font information (e.g., font sets) at separate locations for collecting the needed information for the computer system 202 (or other computing devices). For example, upon identifying fonts, font characters, font subsets, etc. needed for addressing one or missing fonts at the computer system 202, the server 222 may be used to collect needed information from one or more sources external to the font service provider 214 (e.g., via the Internet 206).

Along with producing font information (e.g., complete font sets, font subsets, etc.) and providing it to requesting imaging devices, the font service provider 214 may provide other functionality. For example, fonts and font subsets associated with particular assets (e.g., web assets such as webpages and websites) may be tracked for future requests. In one scenario, one or more font subsets (e.g., included in font file 216) may be created for presenting a particular webpage (on a computing device). The association between the font subsets and the webpage may be identified (e.g., by the server 222) and stored for later retrieval. As such, the subsets needed to present the webpage in the future (e.g., on another computing device) can be quickly identified and provided to the requesting computing device. In one arrangement, a font database 224 is stored at the font service provider 214 (e.g., on the storage device 220) and includes records that represent the association between webpages and font subsets (and fonts). In some instances, the association is identified from information provided by requests sent to the font service provider 214 (e.g., from a software agent). The association between a webpage and appropriate font subsets may also be stored prior to the webpage being selected by a user (e.g., based on directions and information provided by a webpage source). Similarly, the font service provider 214 may perform operations (e.g., track, store, etc.) regarding other types of associations. For example, records may be stored that reflect fonts that are frequently absent from particular imaging devices (e.g., printers, computing devices, etc.) and may need font information (e.g., font sets, font subsets, etc.) to provide corrective action for the imaging device to present one or more assets. Environmental characteristics (e.g., throughput, bandwidth, etc.), device information (e.g., device types, operating system types, etc.), enterprise information (e.g., listing of frequent business communications and type of communications, etc.) may also be stored by the font service provider 214 for determining the font information that may be needed by an imaging device. Other types of architectures and networking techniques may also be implemented for providing software agents and font information (e.g., font sets, subsets, etc.) to imaging devices for presentation of assets such as web assets (e.g., webpages, websites, etc.).

In some arrangements, information provided to the font service provider (e.g., for identifying and providing needed fonts, font subsets, etc.) may include attributes associated with characterizing the environment (e.g., a communication link between the font provider 214 and the imaging device). Such information may be used individually or in concert with other information, for example, information gathered from the content of a web asset (e.g., information scanned from the asset file(s) 210 to identify fonts, font characters, etc. included in the web asset). Other provided attributes may include structural attributes of the web asset (e.g., document layout information and metrics such as number of paragraphs included in the asset, page breaks, characters per line present in the asset, etc.). Attributes may also include information associated with the computing device presenting the asset (e.g., type of device, operating system used by the device, application executed by the device, etc.), the location of the device (e.g., geographic location, for example, to assist with identifying the native language of the user), enterprise information (e.g., company that owns the device to determine if font information has been sent to similar company devices, etc.), etc. Along with using multiple types of information (e.g., communication characteristics, web asset content, geographic location, etc.), previously stored information may be used for determining the appropriate font information (e.g., a font subset, a complete font set, etc.) to provide to one or more imaging devices (e.g., the computer system 202, the tablet computing device 114, the printer 116). For example, information from a data base (e.g., font database 224) may be used for such determinations. Other types of previously stored information may also be used, for example, previously collected communication characteristics (e.g., data transfer rates for links), asset attributes (e.g., web page structure), geographical information, enterprise level information, etc. may be used for making the determination.

By using information from these various sources individually or in concert, appropriate decisions can be made as to identify the appropriate font information (e.g., one or more missing fonts, one or more font subsets, etc.) should be prepared and sent by the font service provider 214 to the computing device (e.g., the computer system 202). The attributes used for the determinations can be considered relatively static or dynamic, for example, while the content of a web asset can be relative static, environmental characteristics (e.g., properties of the communication link between the font provider and a client device) may vary with time (e.g., changing data transfer rates over the course of a day) and location (e.g., data transfer rate changes due to moving the client device, a mobile device, to a different location). Due the variations, one or more techniques may be implemented so relatively current values for dynamic attributes (e.g., communication characteristics) may be used for the determinations. For example, one or more environmental characteristics (e.g., communication link properties, capabilities of a client device) may be monitored and collected for use in such determinations. Various types of data monitoring and collection techniques may be implemented, for example, one or more communication link characteristics may be passively, actively, etc. collected by the imaging device (e.g., computer system 202), the font service provider 214 or by operations executed by the user device and font service provider in concert. Equipment separate from the user computing device and the font service provider 214 may also be implemented. Information may also be exchanged between one or more user computing devices, the font service provider 214 and potentially other devices to assist in font determinations (e.g., identifying missing fonts, producing font subsets, etc.), for example, characteristics of a user computing device (e.g., display capabilities, etc.) may be provided to the font service provider 214. As such, environmental characteristics associated with various equipment, communication links, etc. may be used in making such font determinations.

Figure 3:
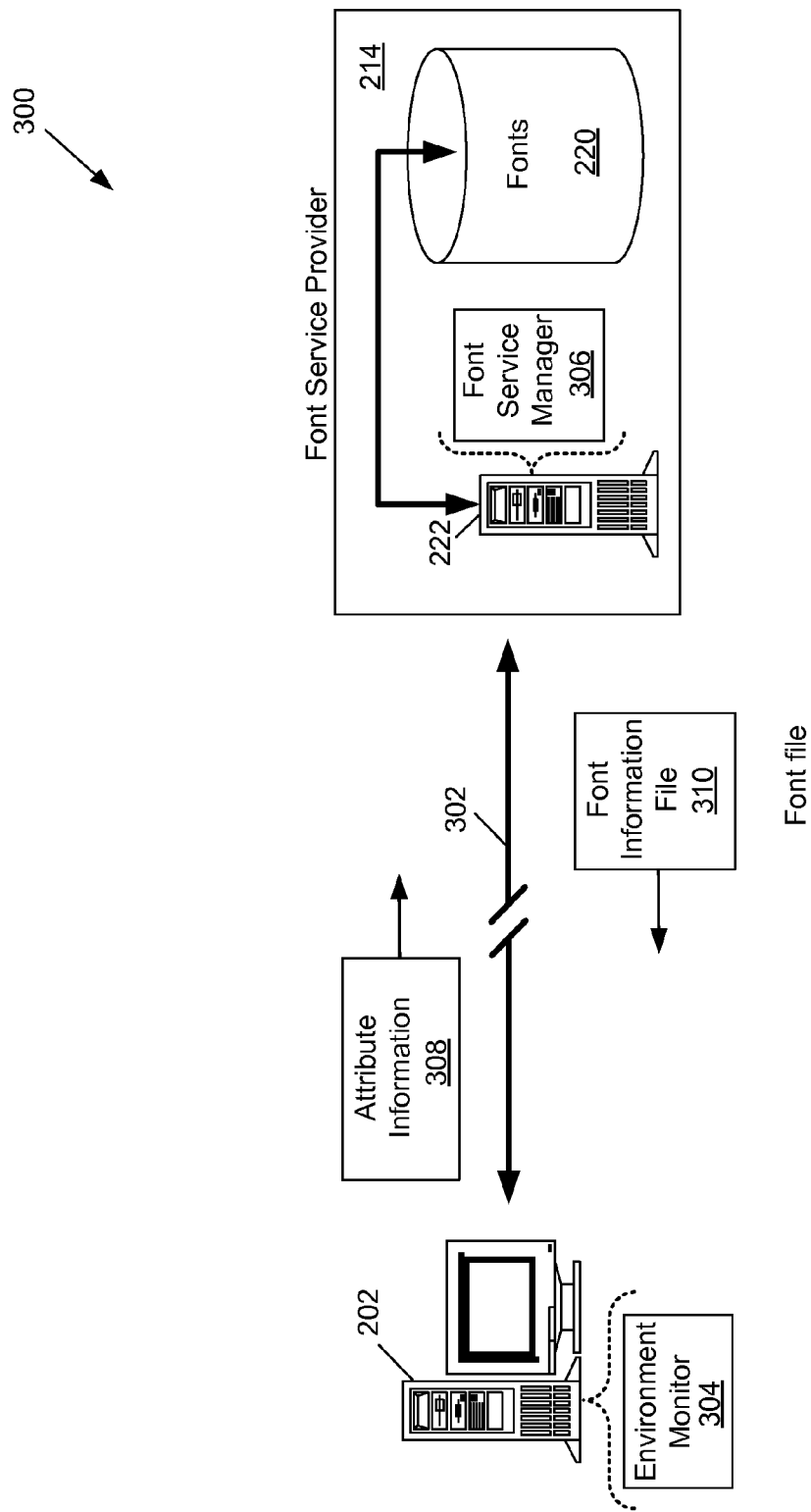
FIGS. 3 and 4 illustrate imaging devices sending information to a font service provider for font management.

Referring to FIG. 3, a diagram 300 represents some potential operations for gathering information for determining the appropriate font information (e.g., complete font set, font subsets, etc.) that should be provided to an imaging device (e.g., the computer system 202). In this particular arrangement, one or more attributes (e.g., missing font information, asset structure information, environmental characteristics, etc.) are collected by the imaging device and provided to the font service provider 214 for font determinations. To perform such attribute collections, the imaging device (e.g., the computer system 202) may execute one or more operations, for example, one or more characteristics of a communication link 302 may be measured by at the computer system 202 and provided to the font service provider 214 for processing. Similarly, contents from an asset (e.g., asset file(s) of a web asset such as a webpage) may be collected for providing to the font service provider 214. Other types of attributes may also be collected and provided through various implementations. For example, in this arrangement, an environment monitor 304 is executed by the computer system 202 to collect environment characteristic information as attributes. While an imaging device (e.g., the computer system 202) is illustrated as collecting such environmental characteristics, such operations may be executed at other locations, individually or in combination with the operations at the imaging device. For example, environmental characteristics (e.g., of the communication link 302) may be measured and quantified by the font service provider 214. In one arrangement, the server 222 may collect information regarding the communication link for assist in determining appropriate font information (e.g., font sets, font subsets) to be sent to the imaging device.

Continuing with this example of collecting attributes, various types of information may be collected that is representative of environmental characteristics. For example, some characteristics may reflect the ability of a communication link (e.g., link 302) to transfer data among one or more imaging devices (e.g., computer system 202) and the font service provider 214. Such characteristics may be associated with the time, rate, etc. for transferring information. Throughput, bandwidth, transmission rates, etc. of the communication link 302 may be measured and quantified by the environment monitor 304. Along with the movement of information, establishing communication between devices (e.g., the computer system 202, the server 222) may be monitored for decisions regarding font information being provided. For example, connection characteristics (e.g., connection speed, bandwidth, HTTP handshake latency, etc.), overhead time (e.g., time needed to send and process a request for font information, etc.), time needed to establish a data connection between the computer system 202 and the server 214 may be measured (e.g., by the environment monitor 304) and provided to the font service provider 214. Other quantities associated with information transfer over the communication link 302 between one or more imaging devices and the font service provider 214 may be identified. For example, protocols (e.g., an internet protocol (IP)) used by one or more imaging devices (and/or intermediate computing devices) and/or the font service provider 214 may be identified and used for font determinations. Ethernet, DSL, Cable, FIOS are examples of some types of protocols that may be identified. Whether the communication link 302 includes wired or wireless communication technology (e.g., wired, wireless access points, etc.) may also be a factor into the determinations. Device options, selected services, ranges of connectivity options (GPRS/Edge, 3G, 4G, etc.) may also be monitored for changes in link capabilities. For example, anticipated connection speeds may be considered to be relatively fast (e.g., mobile devices connected to 3G or 4G networks), however, actual signal strength and connection speed may still vary over time and adversely affect data transfer capabilities (e.g., web page download time) and user experience.

Similar to information associated with the communication link 302, other types of attributes may be collected and provided to the font service provide 214 for subset determinations. For example, characteristics of one or more imaging devices may be provided. Such characteristics may be associated with display capabilities (e.g., screen specifications such as screen size and resolution, printer type, etc.), processing (e.g., operating system used by the device, type of browser executed by the device) and storage capabilities, etc., of the imaging device (e.g., the computer system 202, the printer 116), which can be provided and used by the font service provider 214 to determine appropriate font information to be sent to the device (e.g., a font set to address a font not present at the device). Such device characteristics may be identified locally at the device (e.g., by the environmental monitor 304, one or more software agents), remotely (e.g., by the font service provider 214), or by a combination of local and remote operations.

The environmental monitor 304 may be implemented in one or more arrangements to provide the monitoring functionality at the imaging device (e.g., the computer system 202). For example, the environmental monitor 304 may be implemented as one or more agents (e.g., similar to the agent 212 show in FIG. 2) that may be provided to the computer system 202 through one or more methodologies (e.g., downloaded from or provided by the font service provider 214). One or more applications (e.g., a web browser) may also implement the environmental monitor 304. Along with collecting information (e.g., to be provided to the font service provider 214), the environmental monitor 304 may provide additional functionality such as tracking data and performing statistical analysis on collected data and related information. The collected and processed information may then be provided to the font service provider 214 for assisting in the font decisions and processing (e.g., to optimize font subsetting).

To dynamically execute and make such font-based decisions (e.g., to supply missing fonts, produce appropriate font subsets, etc.), one or more techniques may be implemented by the font service provider 214. In the illustrated example, a font service manager 306 is executed by the server 222 (located at the font service provider 214). From the information provided to the font service provider 214 from the imaging device or devices (e.g., a message 308 that contains environment characteristic attributes along with other attributes), the font service manager 306 determines the appropriate font information (e.g., represented by font information file 310) should be sent to the imaging device (e.g., the computer system 202). In some arrangements the font information (e.g., missing fonts, font subsets, etc.) are prepared and sent based upon delivery of the attribute information (e.g., the message 308 is received by the font service provider 214). Previously produced font sets and subsets may also be sent based upon delivery of the attribute information. For example, due to previously experienced conditions, previously provided asset structure attributes, etc. one or more font, font subsets, etc. may be prepared for delivery to one or more imaging devices. Along with being sent, the prepared font information may be stored for delivery at other instances (e.g., when the same asset is targeted for presenting on another imaging device, when similar environmental characteristics are experienced, etc.), thereby increasing efficiency by allowing one or more previously prepared fonts, font subsets, etc. to be reused by the font service provider 214.

In addition to executing font determinations (e.g., identifying and preparing missing font information to an imaging device), the font service manager 306 may also provide other types of functionality. For example, data provided from imaging devices may be further processed and stored (e.g., in the storage device 220). In some arrangements, such processing may include developing models, e.g., for predicting environmental characteristics, relational databases for different types of imaging devices and previously identified missing fonts, etc. For example, based upon received data (e.g., from imaging devices) representative of one or more characteristics of the communication link 302 (e.g., throughput, bandwidth, etc.) over a period of time, models may be developed for predicting the environment characteristic (e.g., estimates of the throughput for a particular time). Data processing may also include producing (and storing) reports for archiving information such as previously made decisions (e.g., to provide fonts, font subsets, etc.) for various input considerations. For example, for presenting particular content (e.g., a web asset) on a particular imaging device and under certain conditions (e.g., throughput on a communication link), the font service manager 306 may reach a decision of subsetting a particular font (or alternatively, providing a complete character set for the font). By storing information that reflects this decision and the conditions that lead to the decision, future decisions may be expedited if the font service manager 306 recognizes that the conditions have reoccurred. The font service manager 306 may also execute operations for adjusting the fonts, for example, operations for adjusting fonts to improve clarity and the legibility of the produced text (e.g., optimizing font hinting for a particular operating system, font engine, imaging device screen resolution or printing capability, etc.).

Figure 4:
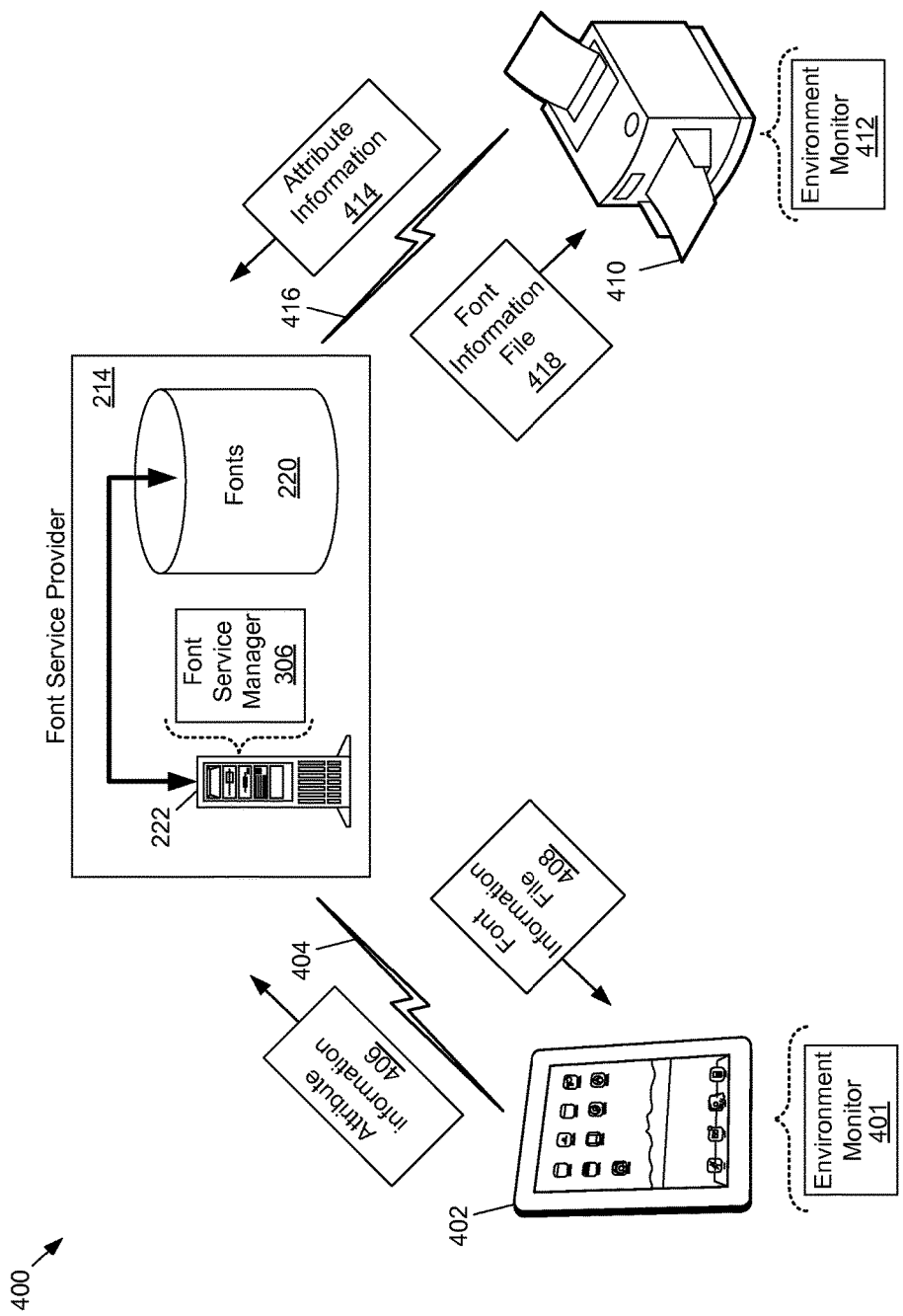

Referring to FIG. 4, a diagram 400 is presented that illustrates that font decisions of the font service provider 214 may depend upon a variety of attributes (e.g., type of imaging device to present an asset, environment characteristics such as location of client device, etc.) that may dynamically change. Similar to FIG. 3, decisions are provided by the font service manager 306 executed by the server 222, e.g., regarding situations such as font sets (from the storage device 220) missing from an imaging device (e.g., a printer), whether to provide one or more font subsets to one or more imaging devices, etc. In this particular illustrated example, the location of the imaging device serves as the determining attribute in regards to font subsetting. For example, an environment monitor 401 being executed by a tablet computing device 402 senses that relatively high throughput communication links may be established with the font service provider 214. A communication link 404 is established and a message 406 is sent to the font service provider 214 to reflect the favorable communication characteristic (along with other attribute information such as the absence of one or more fonts needed to present an asset such as a web page). For example, the tablet computing device 402 may be present at a location that provides for Wi-Fi communications (e.g., through the Internet) with the font service provider 214. As such, large data files (e.g., containing font sets) can generally be transferred to the tablet computing device 402 in a reasonable amount of time. From this throughput characteristic (and potentially other information), the font service manager 306 decides that complete font sets (e.g., represented by font information file 408) may be sent, received and processed by the tablet computing device 402 within a reasonable time period to present the associated web asset content without degrading the viewing experience of a user.

In an alternative situation, other environments may lack the ability to provide appropriate throughput levels, and the font service provider 214 may determine that font subsetting is needed (for transferring one or more font sets missing from an imaging device) to provide an appropriate viewing experience. For example, Latin fonts are generally considered as needing relatively small file sizes for storage, and throughput levels in regions where Latin-based languages are spoken are sufficiently large enough to allow complete font sets to be transferred to imaging devices in a reasonable time. Unfortunately, both assumptions (about file sizes and throughput) may not be consistently correct, and for example, a Latin font with an above-average file size delivered over a slow connection may cause significant delays in presenting an asset to a user. Further, environment characteristics may change, in some cases quite dynamically over a period of time, as the imaging device changes location, etc. As such, the environment characteristics may be frequently monitored by the environment monitor 401 and/or the font service manager 306. For example, the font service provider 214 may request condition updates from the one or more imaging devices (e.g., the tablet computing device 402) that have established communications links (e.g., a periodic polling message may be sent from the font provider 214 to request updates). In some arrangements, the imaging devices may manage the condition updates (e.g., the environment monitor 401 sends updates at periodic intervals, based upon events such as power-up, reset, etc.).

As illustrated in the figure, a remotely located printer 410 may execute an environment monitor 412 that gathers environmental information such as the reception capabilities of the device due to its current location and status of its network connection (e.g., is experiencing poor throughput) and provides these attributes (potentially with other ones e.g., that reflect limited processing and storage capacity of the device, one or more missing fonts, etc.) in a message 414 to the font service provider 214 (e.g., over a low throughput wireless communication link 416). For example the message 414 may include information that identifies one or more fonts used by an asset to be printed but that are not present at the printer 410. Provided this poor throughput and limited device capabilities attributes, the font service manager 306 may determine that font subsetting is needed to provide font data to the printer 410 such that content of an asset (e.g., an electronic document, web asset, etc.) may be processed and printed in a reasonable time frame and the viewer does not become frustrated that the printout does not represent the asset (e.g., a web page) as originally authored. A need for font subsets may also be determined for efficient operation of the imaging device (e.g., the printer 410). For example, font subsets may be provided such that the printer 410 operates in an efficient and substantially continuous manner (e.g., as one page of an electronic document is being printed, a font subset is received and processed by the printer for use in printing one or more subsequent pages). Based on this scenario, one or more font subsets may be produced by the font service provider 214 and sent to the printer 412 (e.g., as illustrated, in a font information file 418 over the communication link 416) to provide the needed font information for printing the asset (e.g., an electronic document, web asset, etc.). As such, a reduced amount of information is provided to the printer while still providing enough information to print a representation of the asset as originally created.

Along with monitoring environment characteristics (e.g., communication link throughput levels, client device capabilities, etc.) other attributes and information may be used the font service provider 214 to determine whether or not fonts should be subsetted prior to delivery to one or more imaging devices. In one arrangement, the content of the asset (to be presented) may be used for assisting in the determination. For example, if a considerable percentage of characters of a font is needed (e.g., 80% of a font's characters is needed to present the first page of a web asset), sending a complete set of the font's character to the imaging device could be considered optimum. Content based information may also be associated with the source or sources of a particular asset. Further, in some arrangements source attributes may be used with device capability attributes for assisting in font subsetting determinations. For example, websites may support different content options that are designed to account for inherent capabilities of particular imaging devices such as mobile devices (e.g., screen size, processing power, limited mobile browser functionality, etc.). One instance of such differences is the content and styling of a website (e.g., http://www.yahoo.com) prepared for a more conventional imaging device (e.g., desktop computer system, laptop computer system, etc.) versus a website (e.g., http://m.yahoo.com) designed for a relatively more limited imaging device (e.g., a smartphone). In some arrangements, the environment monitor 401 may be implemented as an agent and can be exploited to determine if the imaging device is of one type (e.g., a PC-based device) or another (e.g., a mobile device). As such, the imaging devices and their capability attributes can be monitored and used in concert with other environment characteristics (along with other attributes) to dynamically determine whether or not one or more fonts should be subsetted prior to transmission to the client device.

Other techniques and methodologies may be implemented for optimizing the delivery of fonts based on the environment attributes (e.g., of the imaging device), asset content and attributes, imaging device attributes, etc. For example, font subsetting may be executed (by the font service provider 214) for some portions of an asset and not performed for other asset portions. For example, due to a low throughput communication link, one or more font subsets may be provided to an imaging device for presenting as one portion of an asset (e.g., the first page of a web asset such as a set of webpages). While that portion (e.g., the first page) is being presented (and supposedly reviewed by a viewer), complete font sets and/or font subsets for viewing the other portion (or portions) of the asset (e.g., the remaining pages of a web asset) are prepared and sent to the web asset. Initiating the transfer of the font information for the subsequent portions of the asset may be scheduled for one or more time periods. For example, preparing the sending the font information (e.g., font subsets, complete font sets, etc.) may be initiated as the font information is prepared and sent for the initial portion of the asset. In some arrangements, font information for subsequent portions of the asset may be prepared and sent after the font information has been prepared and sent for the initial portion of the asset. As such, font information may be sent from the font service provider 214 in the background as earlier sent font information is readily available for content being presented (e.g., rendered) by the imaging device. Such operations may reduce (e.g., minimize) the time needed to present a first page while enabling full font functionality for the remaining subsequent page views. Other proportioning schemes may also be implemented for font information delivery, for example, frequently used fonts that call for less memory space may be initially sent for use while larger font sets that are less frequently used by a web asset may be sent (e.g., in subsets, complete sets, etc.) afterwards in the background. Similar to other font subsetting arrangements, once a font subset has been produced (e.g., for delivery to an imaging device over a low throughput connection), the subset may be stored (e.g., in the storage device 220) for reuse. For example, once produced and stored, a font subset may be reused for other imaging devices regardless of current environment characteristics (e.g., throughput, connection speed, etc.).

The font service manager 306 and/or the environment monitors 401, 412 may provide other types of functionality. For example, content of a web asset (e.g., a web page) may be monitored (remotely) by the font service manager 306 for changes (e.g., content being added, deleted, adjusted, etc.). When a change is detected in the content, which could be provided from one or multiple sources (e.g., a webpage that includes content from a number of websites), the font service manager 306 may dynamically produce one or more subsets, adjust previously prepared subsets, etc. As such, font subsets and the decision to send one or more subsets to an imaging device may be determined by the font service manager 306 prior to the web asset is requested, thereby reducing response time of the font service provider 214 in making a font or font subset readily available for download when requested.

In addition to the environmental attributes (e.g., achievable throughput for transferring font data to an imaging device, bandwidth analysis, statistics representing communication overhead, etc.), attributes regarding content of the asset (e.g., fonts present in a requested webpage, complete font file sizes, etc.) may also be included in determining whether or not to produce and send font subsets to an imaging device. One or more techniques may be utilized for gathering information regarding the requested asset (e.g., a web asset). For example, one or more agents may be executed by an imaging device (after being downloaded from the font service provider 214) to attain the information and provide it to the font service provider 214 for analysis with other attributes (e.g., environment characteristics). From this information the font service provider 214 may attempt to optimize processing of font requests with the goal of minimizing font download time and, at the same time, optimizing computational operations (e.g., of the server 222) by eliminating unnecessary processing steps, optimizing server response time, etc.

Figure 5:
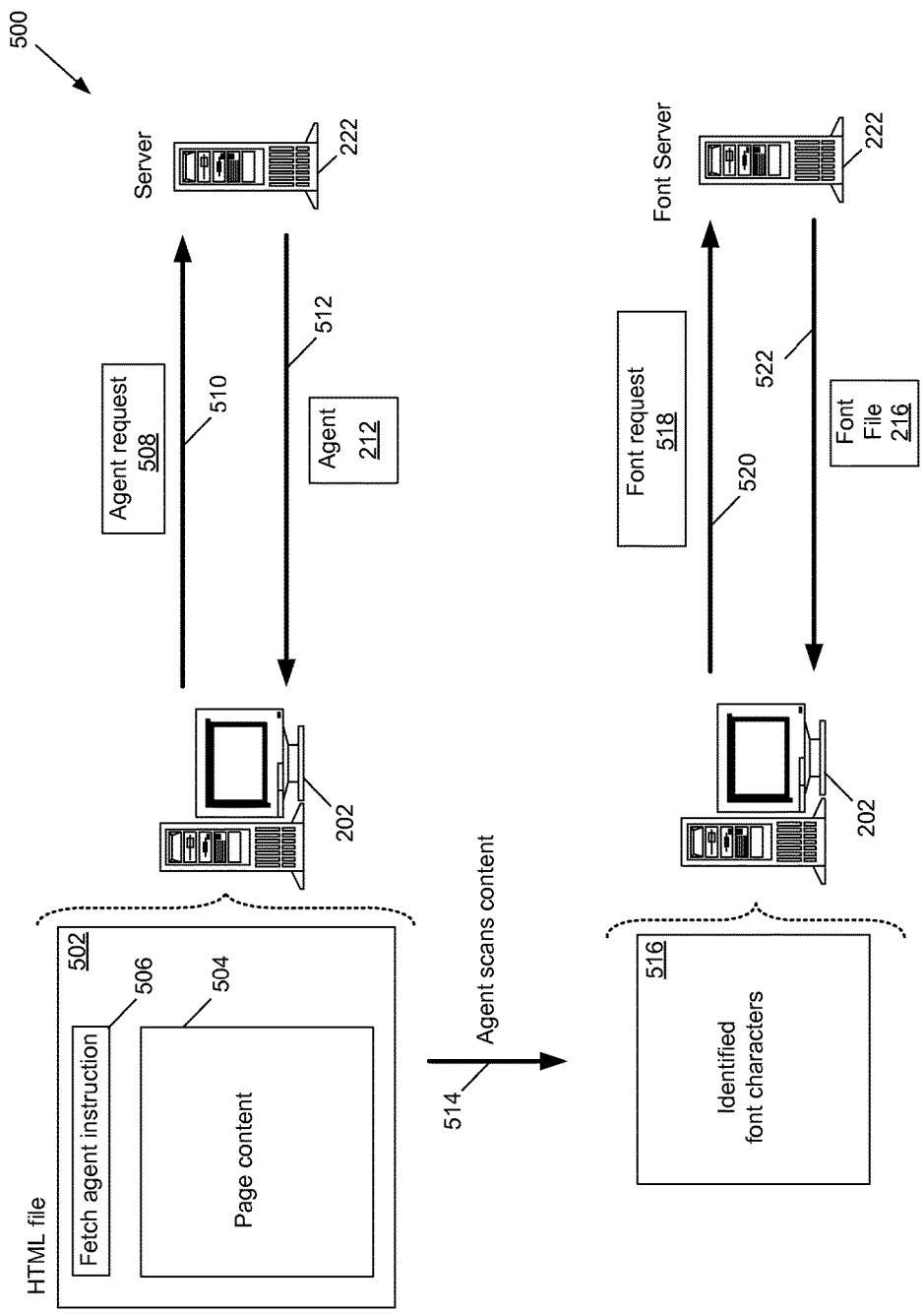
FIG. 5 illustrates requesting and delivering a software agent and font information from a font service provider.

Referring to FIG. 5, a diagram 500 represents some operations for providing a software agent to an imaging device for gathering and providing attributes to the font service provider 214 such that appropriate fonts, font subsets, etc. are provided for presenting a webpage of other type of web asset or asset. As illustrated in FIG. 2, upon a user identifying a web asset (e.g., a webpage) of interest with a web browser executed on a computing device (e.g., providing a URL to the web browser), one or more asset files (e.g., an HTML file, a CSS file, etc.) may be provided to the imaging device from a corresponding webpage source. As illustrated, such a file 502 may include content 504 (e.g., text, graphics, video, audio, etc.) for presenting to the user (via the web browser). The file 502 may also contain one or more instructions 506 for requesting that a software agent be provided to the imaging device. Upon executing the instructions (labeled in the figure "Fetch agent instruction"), delivery of a request 508 may be initiated from the imaging device (e.g., the computer system 202) to the font service provider 214 (e.g., server 222), as represented by graphical arrow 510. In response to the request 508, an agent (e.g., the agent 212) is sent from the server 222 of the font service provider 214 to the computer system 202, as represented by graphical arrow 512. In some instances the delivery of the agent may occur very soon after the file is received and any delay may go unnoticed by a user. In some arrangements, other information may be provided by the request 508. For example, the webpage of interest may be identified in the request (e.g., URL of the webpage provided) so that the font service provider 214 may determine if a one or more font, font subsets, etc. have been previously produced for the webpage.

Received at the imaging device, the requested agent 212 is executed to scan the content 504 of the HTML file 502 (as represented by a graphical arrow 514) to identify characters for each font represented in the content. The agent 212 may also provide the functionality to identify each unique character of each font present. As such, multiple instances of the same font character may only be noted once by the agent, thereby consolidating the characters needed to be requested from the font service provider 214 (for each asset). In some arrangements, the agent 212 notifies the font service provider 214 of each character identified for each font present in the webpage. Upon being provided this information, the font service provider identifies each uniquely occurring character for each font for possible inclusion in a font subset. To provide such scanning operations, one or more techniques may be implemented, for example, the agent may parse the content 504 to identify each character present for each font. One or more filters may then be used (by the agent 212 or the font service provider 214) to identify each unique character for each font. For example, if the characters "a", "B", and "c" for font A are detected in the content 504 and characters "x", "Y", and "Z" for font B are detected, the agent may identify a subset for font A as containing "a", "B" and "c" while the subset for font B may contain "x", "Y" and "Z". Once scanned, identified font characters 516 are used by the agent 212 to produce a font request 518. In general, the request 518 includes each character identified by the agent 212, however, some characters included in the content of the page content 504 may not be included in the request 518. For example, characters identified as possibly being locally stored at the user computing device may not be included in the request 518. As such, the agent 212 may exclude some characters included in the page content 504 from the subset request 518.

In some arrangements other information may be provided from the agent 212 to the font provider 214 for assisting with font and font subset determinations. For example, information regarding fonts locally stored on the computer system 202 (e.g., identification of resident fonts, character sets of the fonts, etc.) may be collected by the agent and provided to the font service provider 214. Once received, the information may be used for one or more procedures such as determining if a one or more fonts, font subsets, etc. need to be produced and provided to the computer system 202, and identifying which fonts, font subsets, etc. to be produced and delivered, etc. The information may also be used for procedures not related to font and font subset determinations, for example, the font service provider may store the information or have the information stored (e.g., provide the information to another facility for storage) for later retrieval and use (e.g., tracking fonts residing at the computer system 202). By monitoring the fonts and font information that resides at one or more imaging devices (e.g., computer system 202, the printer 116, etc.) and the font information that has been provided to each device (e.g., font subsets delivered), the font provider 214 may reduce redundant data transfers and the duplication of font data, thereby optimizing font information transfers and local storage. For example, one or more font transfer techniques may be utilized as described in "Font Data Streaming", U.S. patent application Ser. No. 12/457,792 filed on Jun. 22, 2009, the entire contents of which are hereby incorporated by reference. Such techniques may assist with appropriate font information (e.g., font sets, font subsets, etc.) being transferred to an imaging device for efficient asset presentation (e.g., transferring font information such that printer operations execute efficiently and substantially continuous).

One or more techniques may be implemented to provide the font request 518 to the server 222 of the font service provider 214, as represented by graphical arrow 520. For example, for an agent represented in JavaScript, a technique associated with a protocol such as the hypertext transfer protocol (HTTP) may be used for transferring the request. By appending the identified unique characters to a query string of the URL of interest, a command (e.g., a GET command) can be used to provide the information to the server 222. Similarly, an agent that is provided as an application may provide the font information to the server 222 of the font service provider 214 with a protocol such as HTTP. Once provided the request 518 for the font(s), font subset(s), etc., the server 222 may use this information with additional information (e.g., environmental attributes and other attributes) to produce the one or more needed fonts, font subsets and reply to the imaging device. For example, as represented with graphical arrow 522, the font file 216 (that may represent one or more fonts, font subsets, etc.) is provided to the user computing device.

Figure 6:
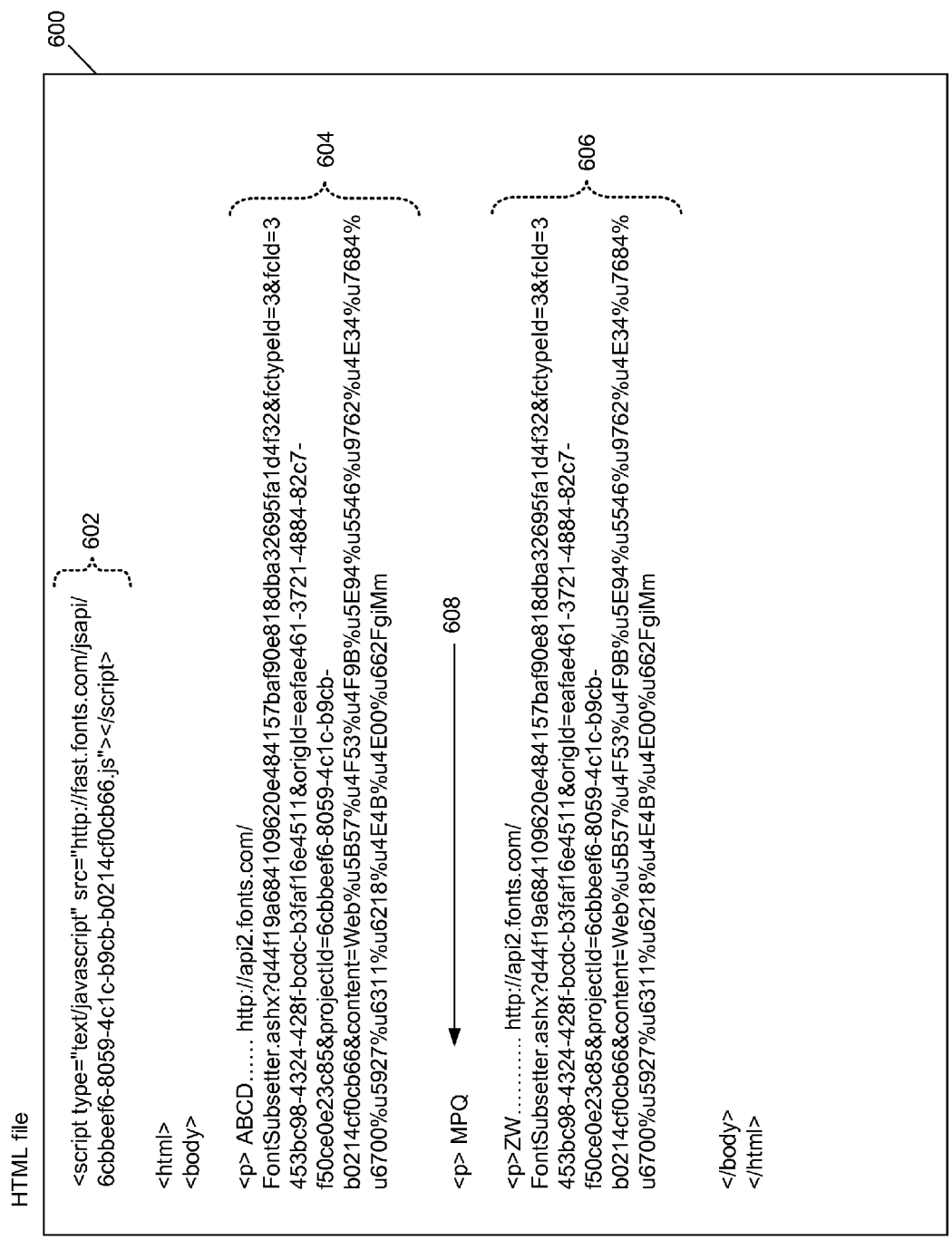
FIG. 6 is an exemplary file for producing a web asset.

Referring to FIG. 6, instructions of an exemplary HTML file 600 are illustrated that include requesting an agent (such as the agent 212 shown in FIG. 2) and assigning fonts to particular characters. In this particular example, upon instruction 602 being executed (e.g., by the computer system 202), an agent is requested from a font service provider (e.g., the font service provider 214). Once received by the computer system 202, the agent is executed to analyze the contents of the HTML file 600. For example, the agent may step through each of the remaining lines of the HTML file 600 and identify each character and font used to present the webpage associated with the contents of the file. For example, by analyzing instruction 604, the agent may identify that characters "A", "B", "C" and "D" in "Frutiger" font are needed for webpage production. In this particular arrangement, the individual characters (e.g., "A B C D") are provided by the instruction 604 along with a URL for accessing the font. Similarly, the executed agent also identifies, in instruction 606, that the characters "Z" and "W" need to be represented in "Frutiger" font to produce the webpage. As such, when producing a font, font subset, etc. request (e.g., request 518 shown in FIG. 5), the agent identifies each of the unique characters (i.e., "A", "B", "C", "D", "Z" and "W") and the corresponding font (i.e., "Frutiger") needed to produce the webpage. In some arrangements, while scanning the content of the file, the agent may come across characters that are not to be included in a font, font subset, etc. request. For example, the HTML file may include an instance in which locally stored fonts on the computer system (executing the file) are to be used for representing particular characters. As such, fonts do not need to be attained from sources external to the computer system. Instruction 608 of the exemplary HTML file 600 illustrates such an occurrence. In this instance, the characters "M", "P" and "Q" are called out by the instruction 608 without a URL for a particular font. As such, fonts local to the computer system executing the file 600 may be used to present the characters "M", "P" and "Q". Since a font or font subset is not needed for these particular characters, the agent does not include these characters in the request 518. However, while these characters are stored locally for this particular font, one or more of these characters may be included in the request for another font based upon another instruction (not shown) in the file 600 that calls out "M", "P" and/or "Q" as being needed in a font attained from a source external to the computer system.

Referring to FIG. 7, one or more techniques may be implemented to analyze the content of a file such as the HTML file 600 (illustrated in FIG. 6) to identify characters for fonts, font subsets, etc. For a JavaScript based agent, a browser independent library (e.g., Prototype, jQuery, etc. that emphasizes interactions between JavaScript and HTML), may be used to analyze text content. To provide this functionality, a Prototype, jQuery, etc. framework may be used to provide an agent for extracting unique characters from a string. The framework may also include an associative array (e.g., referred to as a JSON in some instances) for forming associations between the identified unique characters and a corresponding font. Stepping through the file in an iterative manner, the unique characters are identified and stored (e.g., cached) for further processing. The portion of code 700 presented in the figure can provide this functionality.

Referring to FIG. 8, upon identifying the unique characters, one or more techniques may be implemented to group the identified characters accordingly based upon font. For example, each unique character (e.g., "A", "B", "C", "D", "Z" and "W") identified for a particular font (e.g., "Frutiger") is a member of a group for that font. Additionally, for fonts that have relatively few members (e.g., a font associated with the Latin language), a group of unique characters may not be formed. For such fonts that include relatively fewer members, the entire font set may be sent without consuming considerable computational resources such as transfer time and bandwidth (e.g., as determined in concert with environment attributes). As such, the complete font set may be provided (e.g., from the font service provider) for producing characters of that font. The portion of code 800 presented in the figure can provide this functionality.

Referring to FIG. 9, once the identified unique characters for each font have been grouped (along with any identified fonts that have relatively small character sets), the agent provides this information to the font service provider 214 (e.g., to the server 222 of the font provider). One or more techniques may be used to provide this information. For example, a command such as the HTTP GET command may be used to append identified characters and corresponding fonts to a URL query string. Upon receiving a request (provided by the HTTP GET command), the font service provider 214 (e.g., the server 222 of the font provider) creates and sends one or more appropriate fonts, font subsets, etc. to the requesting imaging device. In some arrangements, complete font sets may also be sent for identified fonts that include relatively few characters, based upon predefined rules associated with one or more attributes (e.g., geographic location of user and/or font service provider, data transfer attributes such as achievable transfer rate, etc.). To provide the identified unique characters and corresponding fonts, a portion of code 900 is presented in the figure that can provide this functionality.

Figure 10:
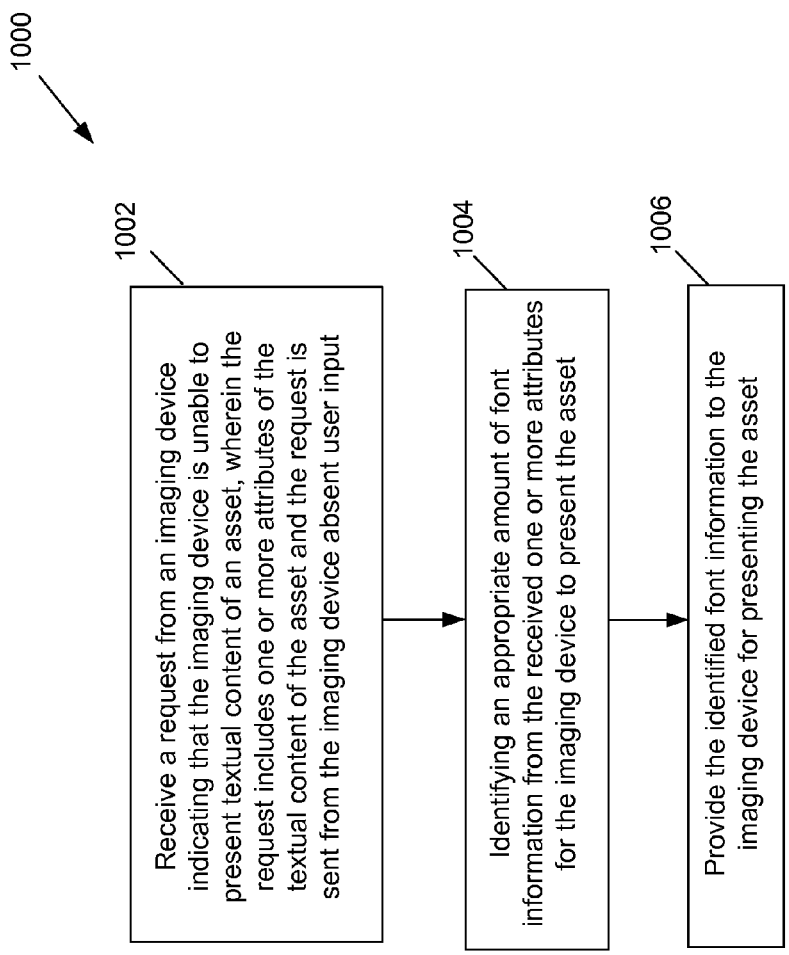
FIG. 10 is an example flow chart of operations of a font service manager.

Referring to FIG. 10, a flowchart 1000 represents operations of a font service manager (e.g., the font service manager 306 shown in FIG. 3). Operations of the font service manager 306 are typically executed by a single computing device (e.g., the server 222), however, operations of the font service manager may be executed by multiple computing devices. Along with being executed at a single site (e.g., the font service provider 214), execution of operation may be distributed among two or more locations.

Operations of the font service manager may include receiving 1002 a request from an imaging device indicating that the imaging device is unable to present textual content of an asset. The request includes one or more attributes of the textual content of the asset and the request is sent from the imaging device absent user input. For example, attributes associated with the asset (e.g., fonts includes asset such as a webpage, number of paragraphs, characters per line, etc.), attributes of the imaging device (e.g., fonts present in the memory of the device, identification information of the imaging device, display resolution, screen size, web browser being executed by the device, etc.), environmental attributes that may represent quantities (e.g., throughput, connection establishment time, bandwidth, etc.) of a communication link between the imaging device (e.g., a tablet computing device, a smartphone, printer, etc.) and equipment of a font service provider (e.g., the server 222). Operations of the font service manager may also include identifying 1004 an appropriate amount of font information from the received one or more attributes from the imaging device to present the asset. For example, based on the provided attributes, the font service subset manager can determine which fonts need to be provided to the imaging device. Additionally, the font service manager can determine whether or not to subset one of more of the fonts (used by the web asset) for efficient transfer of the fonts from the font service provider to the imaging device. Along with using the received attributes, other information such as previously stored attributed and other information (at the font service provider) may be used in making the determination. Operations of the font service manager may also include providing 1006 the identified font information to the imaging device for presenting the asset. For example, if determined that one or more fonts, font subsets, etc. are needed to provide the appropriate font characters for presenting the content of the asset, the font service manager may initiate the preparing and transfer of this font information to the imaging device.

Figure 11:
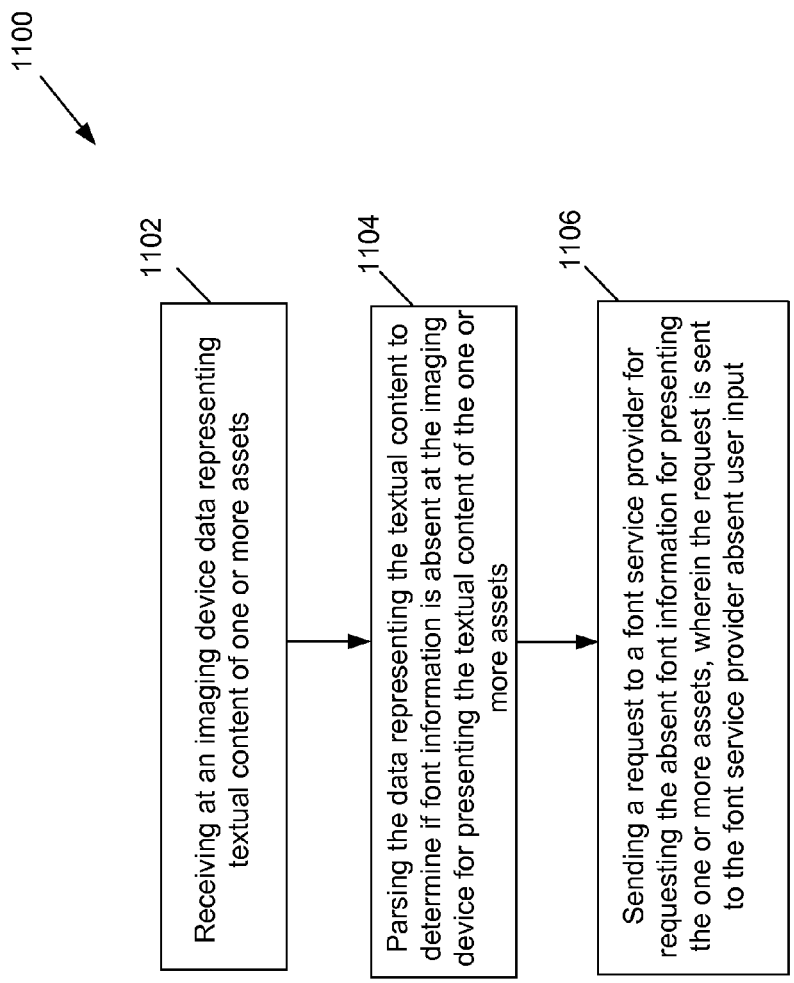
FIG. 11 is an example flow chart of operations of a software agent.

Referring to FIG. 11, a flowchart 1100 represents operations of a software agent (e.g., the agent 212 shown in FIG. 2). As mentioned, operations of the software agent 212 are typically executed by a single computing device (e.g., the computer system 202), however, operations of the software agent may be executed by multiple computing devices. Along with being executed at a single site (e.g., the location of an imaging device), operation execution may be distributed among two or more locations.

Operations of the software agent may include receiving 1102 at an imaging device data representing textual content of one or more assets. For example, the software agent may receive data that represents various types of asset and web assets (e.g., websites, webpages, etc.) from one or more sources (e.g., website sources, repositories, etc.). Operations of the software agent may also include parsing 1104 the data representing the textual content to determine if font information is absent at the imaging device for presenting the textual content of the one or more assets. For example, the agent may identify fonts, characters, etc. present in the content of the asset and check local memory, listing, etc. that reside at the imaging device to determine if one or more of the identified fonts is absent at the device (e.g., not present in the memory of the device). Operations also include sending 1106 a request to a font service provider for requesting the absent font information for presenting the one or more assets. The request is sent to the font service provider absent user input. For example, the software agent may initiate the creating of a request that includes the identified fonts that are used by the asset but are absent at the imaging device. Once created the request can be sent to the font service provider for taking corrective action (e.g., sending data that represents the absent fonts). Corrective actions may also include determining if one or more font subsets would be appropriate based on the content of the asset and sending such subsets to the imaging device for efficient presentation of the asset of interest.

Figure 12:
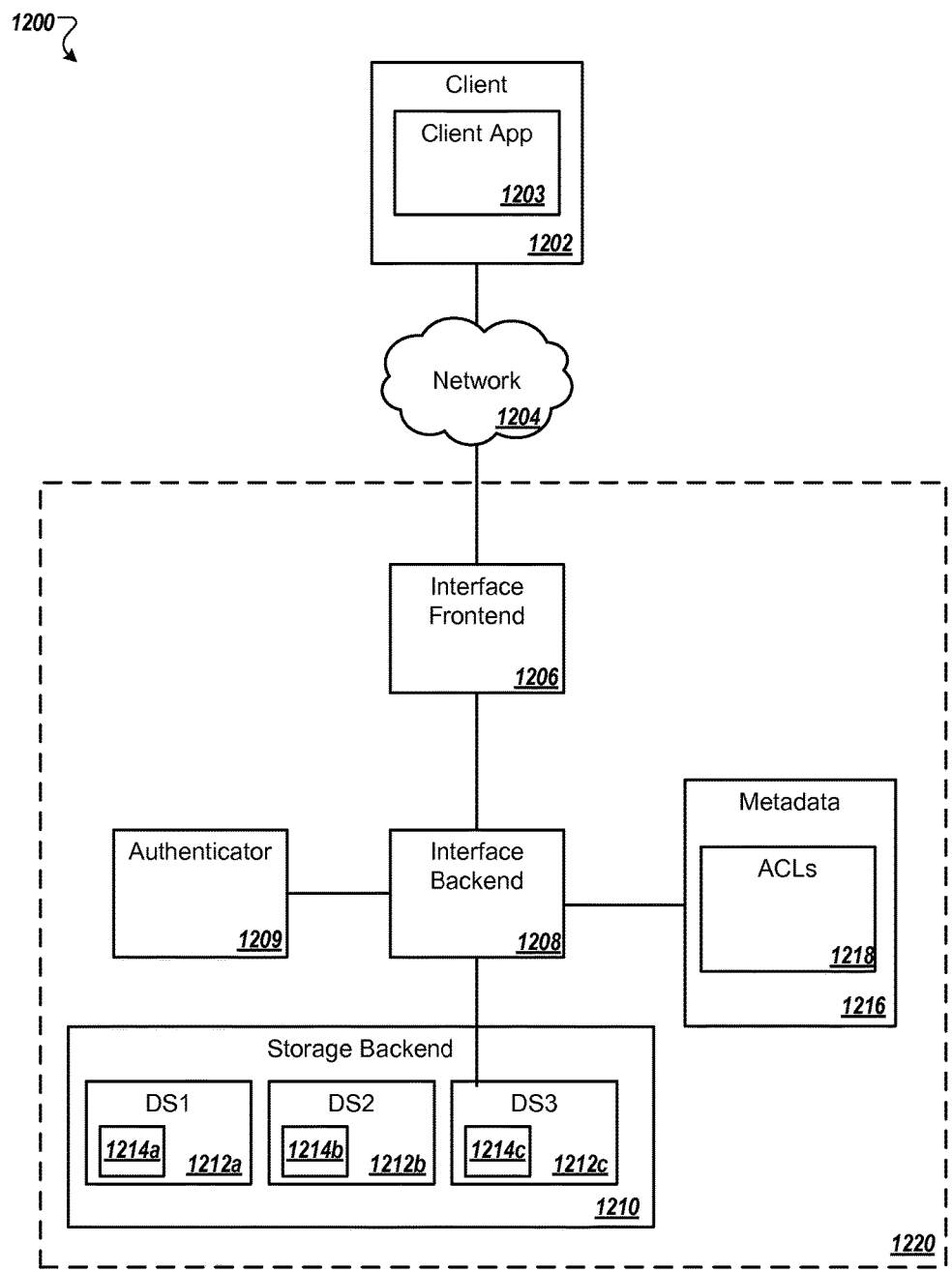
FIG. 12 is a block diagram showing an example of a system for providing hosted storage and accessing the hosted storage from a client device.

FIG. 12 is a block diagram showing an example of a system 1200 for providing hosted storage and accessing the hosted storage from a client device 1202 (e.g., an imaging device). In some implementations, a hosted storage service 1220 may provide access to stored data (e.g., font information) by applications (e.g., web browsers) running on computing devices operating separately from one another, provide offsite data backup and restore functionality, provide data storage to a computing device with limited storage capabilities, and/or provide storage functionality not implemented on a computing device.

The system 1200 may provide scalable stores for storing data resources. The client device 1202 may upload data resources to the hosted storage service 1220 and control access to the uploaded data resources. Access control may include a range of sharing levels (e.g., private, shared with one or more individuals, shared with one or more groups, public, etc.). Data stored in hosted storage service 1220 can be secured from unauthorized access. The hosted storage service 1220 can use a simple and consistent application programming interface, or API, which can allow arbitrary quantities of structured or unstructured data to be kept private or shared between individuals, organizations, or with the world at large. The client device 1202 may access, retrieve, be provided, store, etc. data in the hosted storage service 1220 for any number of a variety of reasons. For example, data may be stored for business reasons (e.g., provide identification information to attain access clearance for font data at the hosted storage service 1220), or for use in data processing by other services.

Figure 13:
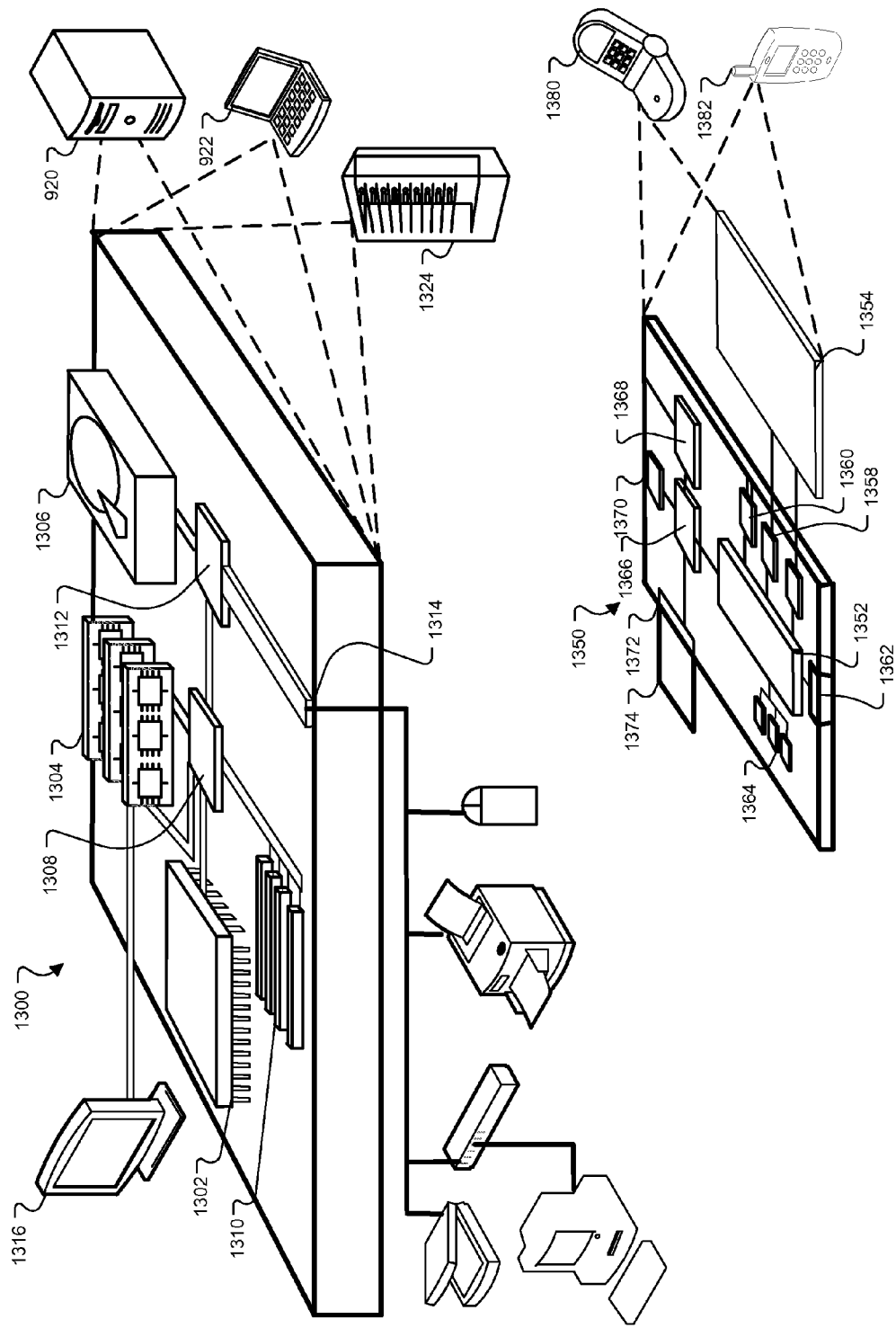
FIG. 13 illustrates an example of a computing device and a mobile computing device that can be used to implement the techniques described here.

The client device 1202 may be implemented using a computing device, such as the computing device 1300 or the mobile device 1350 described with respect to FIG. 13. The client device 1202 may communicate with the hosted storage service 1220 via a network 1204, such as the Internet. The client device 1202 may communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). Electronic mail (e-mail) protocols may also be utilized. For example, one or more e-mail protocols may be used for providing assets (e.g., electronic documents, etc.) to an imaging device (e.g., a printer) from the hosted storage service 1220, a computing device such as the computing device 1300 or the mobile device 1350, etc. While only a single client device 1202 is shown, there may be multiple client devices communicating across the network 1204 with the hosted storage service 1220 and/or other services and devices.

The hosted storage service 1220 may be implemented such that client applications executing on client device 1202, such as a client application 1203, may store, retrieve, or otherwise manipulate data resources in the hosted storage service 1220. The hosted storage service 1220 may be implemented by one or more server devices, which may be implemented using a computing device, such as the computing device 1300 or mobile device 1350 described with respect to FIG. 13. For example, the hosted storage service 1220 may be implemented by multiple server devices operating in the same, or different, data centers.

The hosted storage service 1220 generally includes an interface frontend 1206, an interface backend 1208, a storage backend 1210, and metadata 1216 for resources stored in the storage backend 1210. The hosted storage service 1220 may also include an authenticator 1209 to verify that a user requesting one or more fonts should be provided access to the fonts (e.g., based on a service subscription, rental period, etc.).

In general, the interface frontend 1206 may receive requests from and send responses to the client device 1202. For instance, the hosted storage service 1220 may be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface. Interface frontend 1206 may receive messages from the client 1202 and parse the requests into a format usable by the hosted storage service 1220, such as a remote procedure call (RPC) to an interface backend 1208. The interface frontend 1206 may write responses generated by the hosted storage service 1220 for transmission to the client 1202. In some implementations, multiple interface frontends 1206 may be implemented, for example to support multiple access protocols.

The interface frontend 1206 may include a graphical front end, for example to display on a web browser for data access. The interface frontend 1206 may include a subsystem to enable managed uploads and downloads of large files (e.g., for functionality such as pause, resume, and recover from time-out). The interface frontend 1206 may monitor load information and update logs, for example to track and protect against denial of service (DOS) attacks.

As described above, the Web Service API may be a REST-based HTTP interface. In a REST-based interface, a data resource is accessed as a resource, uniquely named using a uniform resource identifier (URI), and the client application 1203 and service 1220 exchange representations of resource state using a defined set of operations. For example, requested actions may be represented as verbs, such as by HTTP GET, PUT, POST, HEAD, and DELETE verbs. The GET verb may be used to retrieve a resource, while the HEAD verb may be used to retrieve information about a resource without retrieving the resource itself. The DELETE verb may be used to delete a resource from the hosted storage service 1220. The PUT and POST verbs may be used to upload a resource to the service 1220. PUT requests may come from the client 1202 and contain authentication and authorization credentials and resource metadata in a header, such as an HTTP header. POST requests may be received when a client 1202 wants to upload from a web browser form. The form POST upload protocol for the hosted storage service 1220 may involve multiple form fields to provide authentication, authorization, and resource metadata. More generally, any of the API requests may include credentials for authentication and authorization, for example in a header of the request. An authorization header may be included in the REST requests, which may include an access key to identify the entity sending the request.

Alternatively, or additionally, a user may be authenticated based on credentials stored in a browser cookie, which may be appended to the API requests. If no valid cookie is present, a redirect to an authentication frontend may be generated, and the authentication frontend may be used to generate the browser cookie. The authentication frontend may be used by systems and services in addition to the hosted storage service 1220 (e.g., if the organization operating the hosted storage service 1220 also operates other web services such as email service). A user may also or alternatively be authenticated based on authentication credentials from an external credentialing service or an external service that includes credentialing functionality. User or group identifier information may be calculated from the external service's credential information. Requests sent by the client 1202 to the interface frontend 1206 may be translated and forwarded to the external service for authentication.

In general, resources stored in the hosted storage service 1220 may be referenced by resource identifiers. The hosted storage service 1220 may define namespaces to which a valid resource identifier must conform. For example, the namespace may require that resource identifiers be a sequence of Unicode characters whose UTF-8 encoding is at most 1024 bytes long. As another example, the namespace may require that resource identifiers be globally unique identifiers (GUIDs), which may be 128-bit integers.

Resources (e.g., objects such as font data) may be stored in hosted storage service 1220 in buckets. In some examples, each bucket is uniquely named in the hosted storage service 1220, each data resource is uniquely named in a bucket, and every bucket and data resource combination is unique. Data resources may be uniquely identified by a URI that includes the bucket name and the resource name, and identifies the hosted storage service 1220. For example, a resource named "/frutiger.flit" in a bucket named "fonts" could be specified using a URI pattern such as http://s.hostedstoragesystem.com/fonts/frutiger.fnt or http://fonts.s.hostedstoragesystem.com/frutiger.fnt. Alternatively, the user of the client 1202 may create a bucket named my.fonts.org, publish a CNAME alias redirected to http://fonts.s.hostedstoragesystem.com, and address the resource as http://my.fonts.org/frutiger.fnt. In some examples, buckets do not nest.

The interface backend 1208 along with the authenticator 1209 may handle request authentication and authorization, may manage data and metadata, and may track activity such as for billing. As one example, the interface backend 1208 may query the authenticator 1209 when a request for one or more fonts is received. The interface backend 1208 may also provide additional or alternative functionality. For example, the interface backend 1208 may provide functionality for independent frontend/backend scaling for resource utilization and responsiveness under localized heavy loads. Data management may be encapsulated in the interface backend 1208 while communication serving may be encapsulated in the interface frontend 1206. The interface backend 1208 may isolate certain security mechanisms from the client-facing interface frontend 1206.

The interface backend 1208 may expose an interface usable by both the interface frontend 1206 and other systems. In some examples, some features of the interface backend 1208 are accessible only by an interface frontend (not shown) used by the owners of the hosted storage service 1220 (internal users). Such features may include those needed for administrative tasks (e.g., resolving a resource reference to a low level disk address). The interface backend 1208 may handle request authentication (e.g., ensuring a user's credentials are valid) and authorization (e.g., verifying that a requested operation is permitted). The interface backend may also provide encryption and decryption services to prevent unauthorized access to data, even by internal users.

The interface backend 1208 may manage metadata 1216 associated with data resources, for example in a MySQL database or BigTable. User-specified names labeling the buckets can be completely defined within the metadata 1216, and resource metadata 1216 can map a resource name to one or more datastores 1212 storing the resource. The metadata 1216 can also contain bucket and resource creation times, resource sizes, hashes, and access control lists 1218 (ACL 1218) for both buckets and resources. The interface backend 1208 can log activity and track storage consumption to support accounting for billing and chargebacks. In some examples, this includes quota monitoring in each dimension in which customers are charged (e.g., reads, writes, network transfers, total storage in use).

The ACLs 1218 may generally define who is authorized to perform actions on corresponding buckets or resources, and the nature of the permitted actions. The ACLs 1218 may be an unordered list of {scope, role} pairs, plus Boolean flags. The scope may define a user or group of users and the role may define the access permissions for the user or group. In some examples, the union of all {scope, role} pairs may define access rights. In some examples, more specific {scope, role} pairs override more general ones.

The storage backend 1210 may contain multiple datastores 1212a-1212c. Although three datastores 1212 are shown, more or fewer are possible. Each of the datastores 1212a-1212c may store data resources 1214a-1214c in a particular format. For example, data store 1212a may store a data resource 1214a as a Binary Large Object (BLOB), data store 1212b may store a data resource 1214b in a distributed file system (e.g., Network File System), and data store 1212c may store a data resource 1214c in a database (e.g., MySQL).

FIG. 13 shows an example of example computer device 1300 and example mobile computer device 1350, which can be used to implement the techniques described herein. For example, a portion or all of the operations of the font service manager 306 (shown in FIG. 3) or the software agent 212 (shown in FIG. 2) may be executed by the computer device 1300 and/or the mobile computer device 1350. Computing device 1300 is intended to represent various forms of digital computers, including, e.g., laptops, desktops, workstations, personal digital assistants, servers, blade servers, mainframes, and other appropriate computers. Computing device 1350 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 1300 includes processor 1302, memory 1304, storage device 1306, high-speed interface 1308 connecting to memory 1304 and high-speed expansion ports 1310, and low speed interface 1312 connecting to low speed bus 1314 and storage device 1306. Each of components 1302, 1304, 1306, 1308, 1310, and 1312, are interconnected using various busses, and can be mounted on a common motherboard or in other manners as appropriate. Processor 1302 can process instructions for execution within computing device 1300, including instructions stored in memory 1304 or on storage device 1306 to display graphical data for a GUI on an external input/output device, including, e.g., display 1316 coupled to high speed interface 1308. In other implementations, multiple processors and/or multiple buses can be used, as appropriate, along with multiple memories and types of memory. Also, multiple computing devices 1300 can be connected, with each device providing portions of the necessary operations (e.g., as a server bank, a group of blade servers, or a multi-processor system).

Memory 1304 stores data within computing device 1300. In one implementation, memory 1304 is a volatile memory unit or units. In another implementation, memory 1304 is a non-volatile memory unit or units. Memory 1304 also can be another form of computer-readable medium, including, e.g., a magnetic or optical disk. Memory 1304 may be non-transitory.

Storage device 1306 is capable of providing mass storage for computing device 900. In one implementation, storage device 1306 can be or contain a computer-readable medium, including, e.g., a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 1304, storage device 1306, memory on processor 1302, and the like.

High-speed controller 1308 manages bandwidth-intensive operations for computing device 1300, while low speed controller 1312 manages lower bandwidth-intensive operations. Such allocation of functions is an example only. In one implementation, high-speed controller 1308 is coupled to memory 1304, display 1316 (e.g., through a graphics processor or accelerator), and to high-speed expansion ports 1310, which can accept various expansion cards (not shown). In the implementation, low-speed controller 1312 is coupled to storage device 1306 and low-speed expansion port 1314. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 1300 can be implemented in a number of different forms, as shown in the figure. For example, it can be implemented as standard server 1320, or multiple times in a group of such servers. It also can be implemented as part of rack server system 1324. In addition or as an alternative, it can be implemented in a personal computer including, e.g., laptop computer 1322. In some examples, components from computing device 1300 can be combined with other components in a mobile device (not shown), including, e.g., device 1350. Each of such devices can contain one or more of computing device 1300, 1350, and an entire system can be made up of multiple computing devices 1300, 1350 communicating with each other.

Computing device 1350 includes processor 1352, memory 1364, an input/output device including, e.g., display 1354, communication interface 1366, and transceiver 1368, among other components. Device 1350 also can be provided with a storage device, including, e.g., a microdrive or other device, to provide additional storage. Each of components 1350, 1352, 1364, 1354, 1366, and 1368, are interconnected using various buses, and several of the components can be mounted on a common motherboard or in other manners as appropriate.

Processor 1352 can execute instructions within computing device 1350, including instructions stored in memory 1364. The processor can be implemented as a chipset of chips that include separate and multiple analog and digital processors. The processor can provide, for example, for coordination of the other components of device 1350, including, e.g., control of user interfaces, applications run by device 1350, and wireless communication by device 1350.

Processor 1352 can communicate with a user through control interface 1358 and display interface 1356 coupled to display 1354. Display 1354 can be, for example, a TFT LCD (Thin-Film-Transistor Liquid Crystal Display) or an OLED (Organic Light Emitting Diode) display, or other appropriate display technology. Display interface 1356 can comprise appropriate circuitry for driving display 1354 to present graphical and other data to a user. Control interface 1358 can receive commands from a user and convert them for submission to processor 1352. In addition, external interface 1362 can communicate with processor 1342, so as to enable near area communication of device 1350 with other devices. External interface 1362 can provide, for example, for wired communication in some implementations, or for wireless communication in other implementations, and multiple interfaces also can be used.

Memory 1364 stores data within computing device 1350. Memory 1364 can be implemented as one or more of a computer-readable medium or media, a volatile memory unit or units, or a non-volatile memory unit or units. Expansion memory 1374 also can be provided and connected to device 1350 through expansion interface 1372, which can include, for example, a SIMM (Single In Line Memory Module) card interface. Such expansion memory 1374 can provide extra storage space for device 1350, or also can store applications or other data for device 1350. Specifically, expansion memory 1374 can include instructions to carry out or supplement the processes described above, and can include secure data also. Thus, for example, expansion memory 1374 can be provided as a security module for device 1350, and can be programmed with instructions that permit secure use of device 1350. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 1364, expansion memory 1374, and/or memory on processor 1352, which can be received, for example, over transceiver 968 or external interface 1362.

Device 1350 can communicate wirelessly through communication interface 1366, which can include digital signal processing circuitry where necessary. Communication interface 1366 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 968. In addition, short-range communication can occur, including, e.g., using a Bluetooth®, WiFi, or other such transceiver (not shown). In addition, GPS (Global Positioning System) receiver module 1370 can provide additional navigation- and location-related wireless data to device 1350, which can be used as appropriate by applications running on device 1350. Sensors and modules such as cameras, microphones, compasses, accelerators (for orientation sensing), etc. maybe included in the device.

Device 1350 also can communicate audibly using audio codec 1360, which can receive spoken data from a user and convert it to usable digital data. Audio codec 1360 can likewise generate audible sound for a user, including, e.g., through a speaker, e.g., in a handset of device 1350. Such sound can include sound from voice telephone calls, can include recorded sound (e.g., voice messages, music files, and the like) and also can include sound generated by applications operating on device 1350.

Computing device 1350 can be implemented in a number of different forms, as shown in the figure. For example, it can be implemented as cellular telephone 1380. It also can be implemented as part of smartphone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:
receiving a request initiated by a software agent executed by an imaging device indicating that the imaging device is unable to present textual content of an asset as determined by the software agent parsing data representing each character of the textual content of the asset, wherein the software agent operates in an autonomous manner and the request includes one or more attributes of the textual content of the asset and the request is absent user provided data input to the imaging device;
identifying an appropriate amount of font information from the received one or more attributes for the imaging device to present the asset; and
providing the identified font information to the imaging device for presenting the asset.

2. The computer-implemented method of claim 1, wherein identifying the appropriate amount of font information includes identifying one or more fonts.

3. The computer-implemented method of claim 1, wherein identifying the appropriate amount of font information includes creating one or more fonts.

4. The computer-implemented method of claim 1, wherein the appropriate amount of font information includes one or more font subsets based on the textual content of the asset.

5. The computer-implemented method of claim 1, wherein the one or more attributes include information for identifying one or more fonts absent from the imaging device.

6. The computer-implemented method of claim 1, wherein the one or more attributes include information for identifying one or more fonts absent from the asset.

7. The computer-implemented method of claim 1, wherein the one or more attributes include information representing the structure of the asset.

8. The computer-implemented method of claim 1, wherein the request also includes one or more environmental characteristics of a communication connection between the imaging device and a font service provider.

9. The computer-implemented method of claim 1, wherein the request includes one or more attributes that represent at least one capability of the imaging device.

10. The computer-implemented method of claim 1, wherein the request includes geographical information regarding the location of the imaging device.

11. A computer-implemented method comprising:
receiving at an imaging device data representing textual content of one or more assets;
a software agent executed by the imaging device, parsing the data representing each character of the textual content to determine if font information is absent at the imaging device for presenting the textual content of the one or more assets, wherein the agent operates in an autonomous manner; and
sending a request initiated by the software agent executed by the imaging device to a font service provider for requesting the absent font information for presenting the one or more assets, wherein the request is sent to the font service provider absent user provided data input to the imaging device.

12. The computer-implemented method of claim 11, wherein the request identifies a font used by the textual content of the one or more assets but absent at the imaging device.

13. The computer-implemented method of claim 11, wherein the request identifies information associated with the one or more assets to be presented by the imaging device.

14. The computer-implemented method of claim 11, wherein parsing the data representing the textual content includes identifying each character present in the textual content of the one or more assets.

15. The computer-implemented method of claim 11, wherein the request identifies each character present in the textual content of the one or more assets.

16. A system comprising:
a computing device comprising:
a memory configured to store instructions; and
a processor to execute the instructions to perform operations comprising:
receiving a request initiated by a software agent executed by an imaging device indicating that the imaging device is unable to present textual content of an asset determined by parsing data representing each character of the textual content of the asset, wherein the software agent operates in an autonomous manner and the request includes one or more attributes of the textual content of the asset and the request is sent from the imaging device absent user provided data input to the imaging device;
identifying an appropriate amount of font information from the received one or more attributes for the imaging device to present the asset; and
providing the identified font information to the imaging device for presenting the asset.

17. The system of claim 16, wherein identifying the appropriate amount of font information includes identifying one or more fonts.

18. The system of claim 16, wherein identifying the appropriate amount of font information includes creating one or more fonts.

19. The system of claim 16, wherein the appropriate amount of font information includes one or more font subsets based on the textual content of the asset.

20. The system of claim 16, wherein the one or more attributes include information for identifying one or more fonts absent from the imaging device.

21. The system of claim 16, wherein the one or more attributes include information for identifying one or more fonts absent from the asset.

22. The system of claim 16, wherein the one or more attributes include information representing the structure of the asset.

23. The system of claim 16, wherein the request also includes one or more environmental characteristics of a communication connection between the imaging device and a font service provider.

24. The system of claim 16, wherein the request includes one or more attributes that represent at least one capability of the imaging device.

25. The system of claim 16, wherein the request includes geographical information regarding the location of the imaging device.

26. A system comprising:
an imaging device comprising:
a memory configured to store instructions; and
a processor to execute the instructions to perform operations comprising:
receiving at the imaging device data representing each character of textual content of one or more assets;
a software agent executed by the imaging device, parsing the data representing the textual content to determine if font information is absent at the imaging device for presenting the textual content of the one or more assets, wherein the software agent operates in an autonomous manner; and
sending a request initiated by the software agent executed by the imaging device to a font service provider for requesting the absent font information for presenting the one or more assets, wherein the request is sent to the font service provider absent user provided data input to the imaging device.

27. The system of claim 26, wherein the request identifies a font used by the textual content of the one or more assets but absent at the imaging device.

28. The system of claim 26, wherein the request identifies information associated with the one or more assets to be presented by the imaging device.

29. The system of claim 26, wherein parsing the data representing the textual content includes identifying each character present in the textual content of the one or more assets.

30. The system of claim 26, wherein the request identifies each character present in the textual content of the one or more assets.

31. One or more computer readable media storing instructions that are executable by a processing device, and upon such execution cause the processing device to perform operations comprising:
receiving a request initiated by a software agent executed by an imaging device indicating that the imaging device is unable to present textual content of an asset determined by parsing data representing each character of the textual content of the asset, wherein the software agent operates in an autonomous manner and the request includes one or more attributes of the textual content of the asset and the request is sent from the imaging device absent user provided data input to the imaging device;
identifying an appropriate amount of font information from the received one or more attributes for the imaging device to present the asset; and
providing the identified font information to the imaging device for presenting the asset.

32. The computer readable media of claim 31, wherein identifying the appropriate amount of font information includes identifying one or more fonts.

33. The computer readable media of claim 31, wherein identifying the appropriate amount of font information includes creating one or more fonts.

34. The computer readable media of claim 31, wherein the appropriate amount of font information includes one or more font subsets based on the textual content of the asset.

35. The computer readable media of claim 31, wherein the one or more attributes include information for identifying one or more fonts absent from the imaging device.

36. The computer readable media of claim 31, wherein the one or more attributes include information for identifying one or more fonts absent from the asset.

37. The computer readable media of claim 31, wherein the one or more attributes include information representing the structure of the asset.

38. The computer readable media of claim 31, wherein the request also includes one or more environmental characteristics of a communication connection between the imaging device and a font service provider.

39. The computer readable media of claim 31, wherein the request includes one or more attributes that represent at least one capability of the imaging device.

40. The computer readable media of claim 31, wherein the request includes geographical information regarding the location of the imaging device.

41. One or more computer readable media storing instructions that are executable by a processing device, and upon such execution cause the processing device to perform operations comprising:
receiving at an imaging device data representing textual content of one or more assets;
a software agent executed by the imaging device, parsing the data representing each character of the textual content to determine if font information is absent at the imaging device for presenting the textual content of the one or more assets, wherein the software agent operates in an autonomous manner; and
sending a request initiated by the software agent executed by the imaging device to a font service provider for requesting the absent font information for presenting the one or more assets, wherein the request is sent to the font service provider absent user provided data input to the imaging device.

42. The computer readable media of claim 41, wherein the request identifies a font used by the textual content of the one or more assets but absent at the imaging device.

43. The computer readable media of claim 41, wherein the request identifies information associated with the one or more assets to be presented by the imaging device.

44. The computer readable media of claim 41, wherein parsing the data representing the textual content includes identifying each character present in the textual content of the one or more assets.

45. The computer readable media of claim 41, wherein the request identifies each character present in the textual content of the one or more assets.

46. A system comprising:
a computing device located at a font service provider, comprising:
a memory configured to store instructions; and
a processor to execute the instructions to perform operations comprising:
receiving a request initiated by a software agent executed by an imaging device indicating that the imaging device is unable to present textual content of an asset determined by parsing data representing each character of the textual content of the asset, the imaging device being remotely located from the fonts service provider, wherein the software agent operates in an autonomous manner and the request includes one or more attributes of the textual content of the asset and the request is sent from the imaging device absent user provided data input to the imaging device, the request also includes one or more environmental characteristics of a communication connection between the imaging device and the font service provider, and, one or more attributes that represent at least one capability of the imaging device;
identifying an appropriate amount of font information from the request to present the asset; and
providing the identified font information to the imaging device for presenting the asset.

47. The system of claim 46, wherein the request includes geographical information regarding the location of the imaging device.

48. A system comprising:
an imaging device comprising:
a memory configured to store instructions; and
a processor to execute the instructions to perform operations comprising:
receiving at the imaging device data representing textual content of one or more assets;
parsing, by a software agent executed by the imaging device, the data representing each character of the textual content to determine if font information is absent at the imaging device for presenting the textual content of the one or more assets, wherein the software agent operates in an autonomous manner;
determining one or more environmental characteristics of a communication connection between the imaging device and a remotely located font service provider; and
sending a request initiated by the software agent executed by the imaging device to the font service provider for requesting the absent font information for presenting the one or more assets, wherein the request is sent to the font service provider absent user provided data input to the imaging device, the request also includes the determined one or more environmental characteristics of a communication connection between the imaging device and the font service provider, and, one or more attributes that represent at least one capability of the imaging device.

49. The system of claim 48, wherein the request includes geographical information regarding the location of the imaging device.

50. The system of claim 48, wherein the one or more environmental characteristics include temporal information regarding connection establishment.

51. The system of claim 48, wherein the one or more environmental characteristics include protocol information.

52. The system of claim 48, wherein the one or more environmental characteristics of a communication connection represents one of achievable throughput and bandwidth analysis.

* * * * *